United States Patent [19]

Soubaras

[11] Patent Number: 5,771,203
[45] Date of Patent: Jun. 23, 1998

[54] SEISMIC PROSPECTION METHOD WITH APPLICATION OF A SELF-DECONVOLUTED PREDICTION ERROR FILTER

[75] Inventor: Robert Soubaras, Orsay, France

[73] Assignee: Compagnie Generale de Geophysique, Massy, France

[21] Appl. No.: 649,694

[22] PCT Filed: Sep. 25, 1995

[86] PCT No.: PCT/FR95/01231

§ 371 Date: May 22, 1996

§ 102(e) Date: May 22, 1996

[87] PCT Pub. No.: WO96/09562

PCT Pub. Date: Mar. 28, 1996

[30]   Foreign Application Priority Data

Sep. 23, 1994 [FR] France ................................. 94 11398

[51] Int. Cl.[6] ..................................................... G01V 1/36
[52] U.S. Cl. ............................... 367/46; 367/45; 364/421
[58] Field of Search ...................... 367/45, 46; 364/421

[56]   References Cited

U.S. PATENT DOCUMENTS

| | | | |
|---|---|---|---|
| 4,630,242 | 12/1986 | Done ........................................ | 367/73 |
| 4,853,903 | 8/1989 | Linville, Jr. et al. ................... | 367/46 |
| 5,182,729 | 1/1993 | Duren et al. ............................ | 367/38 |
| 5,400,265 | 3/1995 | Kauppinen ............................. | 364/576 |

FOREIGN PATENT DOCUMENTS 730744  9/1996  European Pat. Off. .

9609562  3/1996  WIPO .

OTHER PUBLICATIONS

Soufaras, R, 57th Bage Conf., Jun. 2, 1995; p. No. A 051, vol. 1.

Mendel, S.M.;Geophysical Prospecting , V. 25, #4, pp. 692–698, Dec. 1977; Abst. Only Herewith.

Mahalanabis, et al., "A Fast Optimal Deconvolution Algorithm for Real Seismic Data Using Kalman Predictor Model," pp. 216–221 *IEEE Transactions on Geoscience and Remote Sensing*(Oct. 1981).

*Primary Examiner*—Nelson Moskowitz
*Attorney, Agent, or Firm*—Arnold, White & Durkee

[57]   ABSTRACT

The invention relates to a seismic prospection method in which a seismic disturbance is generated in the sub-soil and sensors are used to pick up seismic data, the seismic data being processed to deduce useful information concerning the geology of the sub-soil, the seismic data containing a signal $y_0$ that is to be isolated, said signal $y_0$ being present in the seismic data embedded in an additive signal. The method comprises the steps consisting in: 1) for a given integer p, computing a prediction error filter a having p coefficients and providing best cancellation of the signal $y_0$; 2) applying the self-deconvoluted prediction error filter to the seismic data to obtain filtered data in which the signal $y_0$ is absent; and 3) subtracting the filtered data from the initial data to obtain processed data containing the signal $y_0$ without the additive signal.

27 Claims, 11 Drawing Sheets

FIG_1

FIG_6

FIG_7

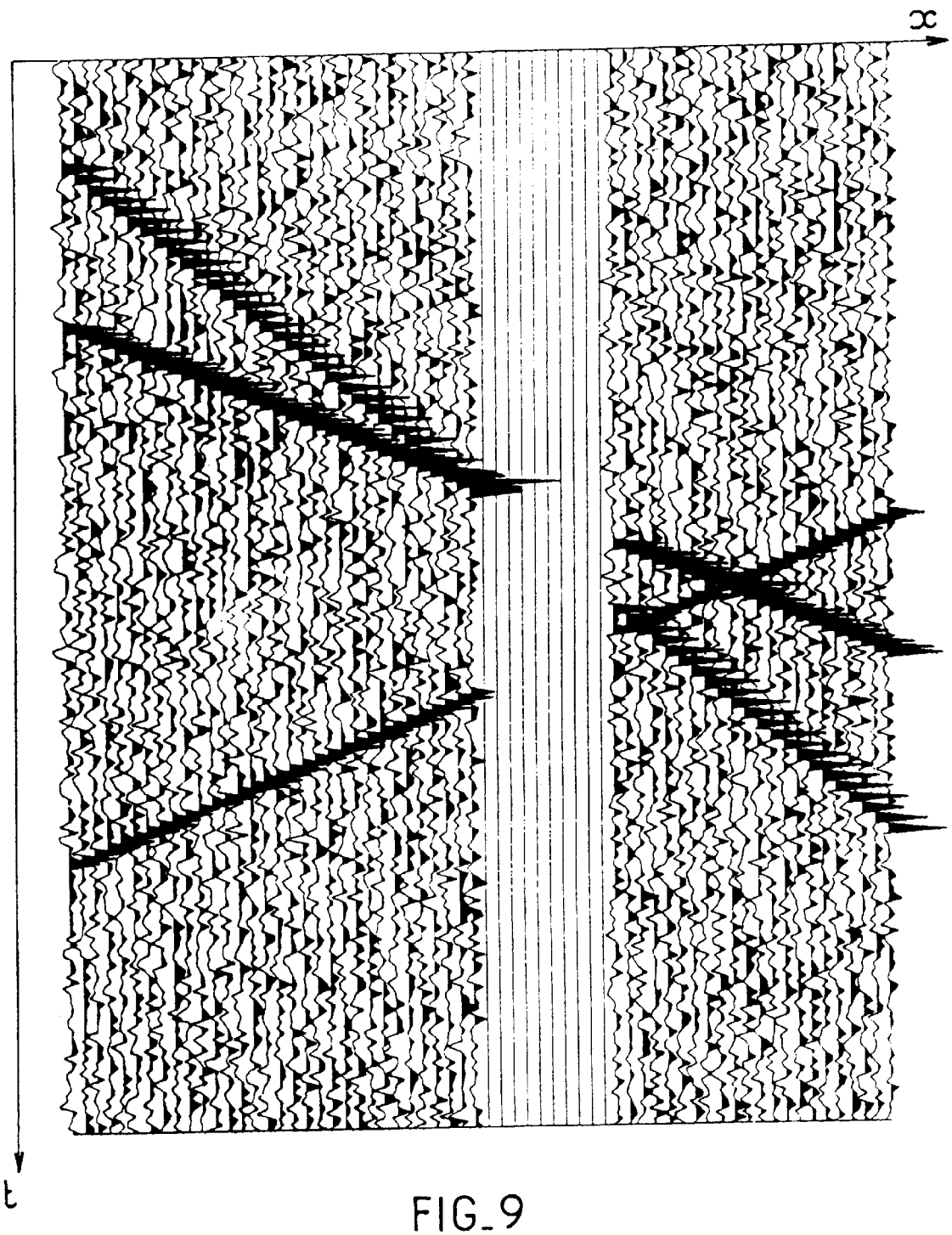
FIG_9

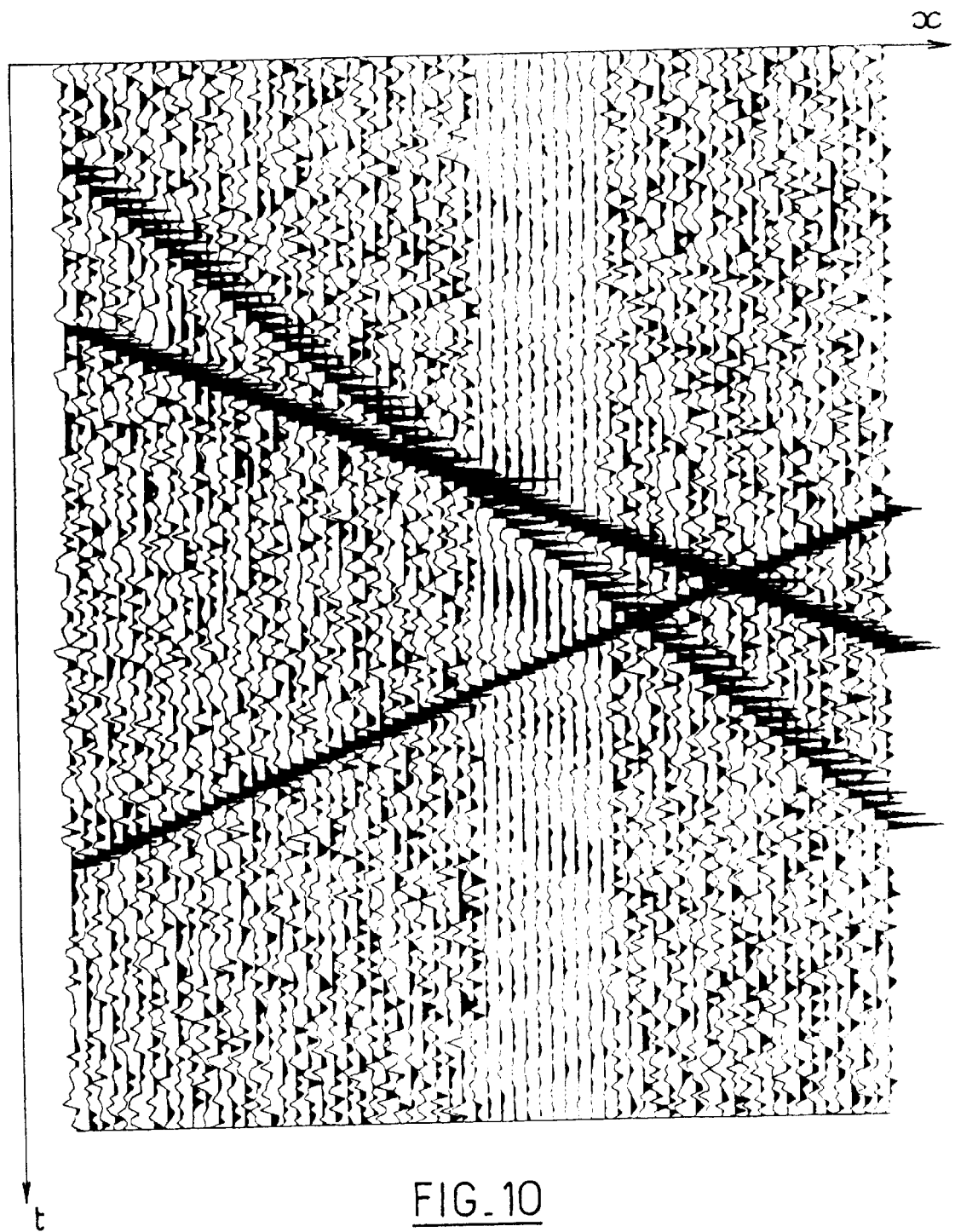
FIG_10

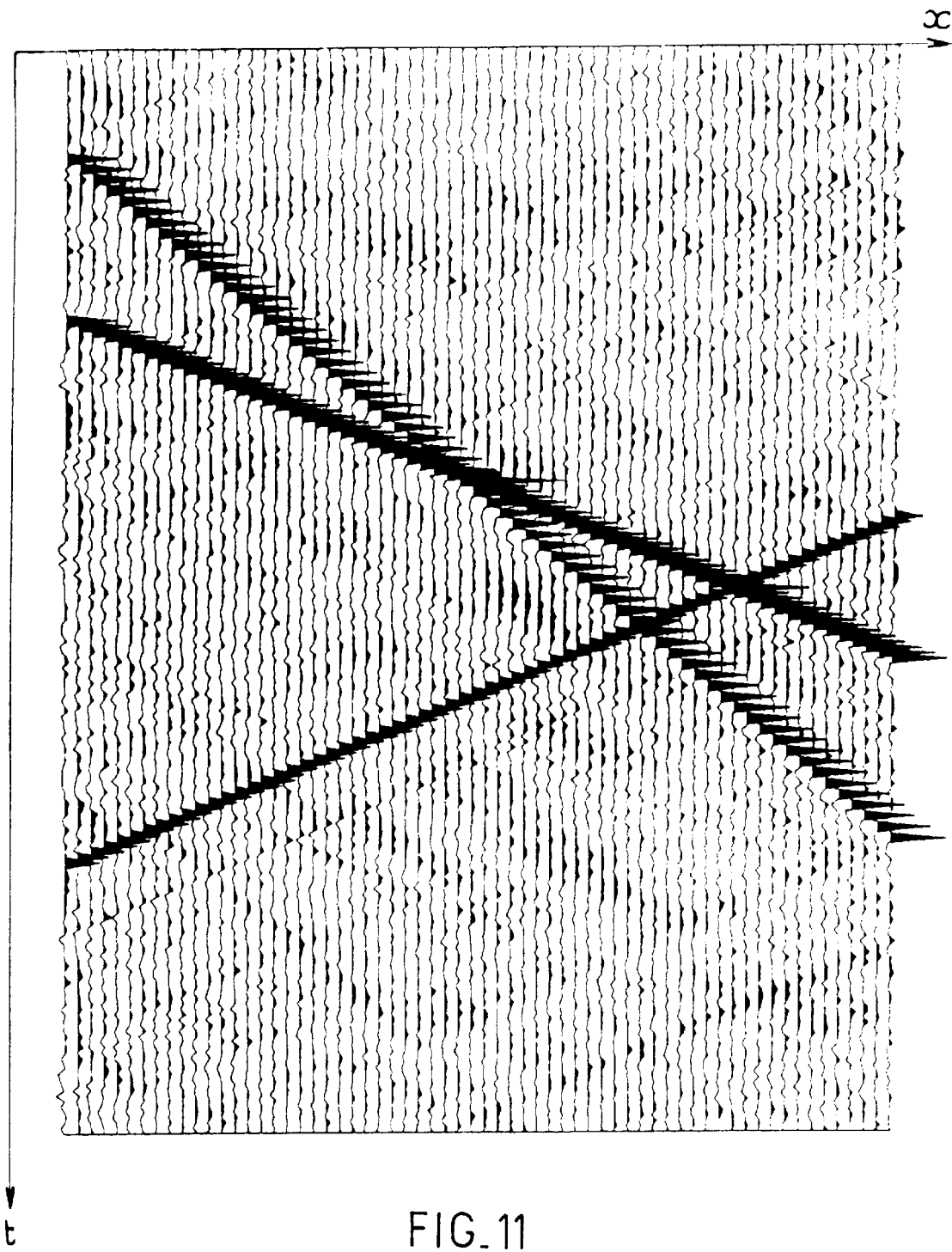
FIG_11

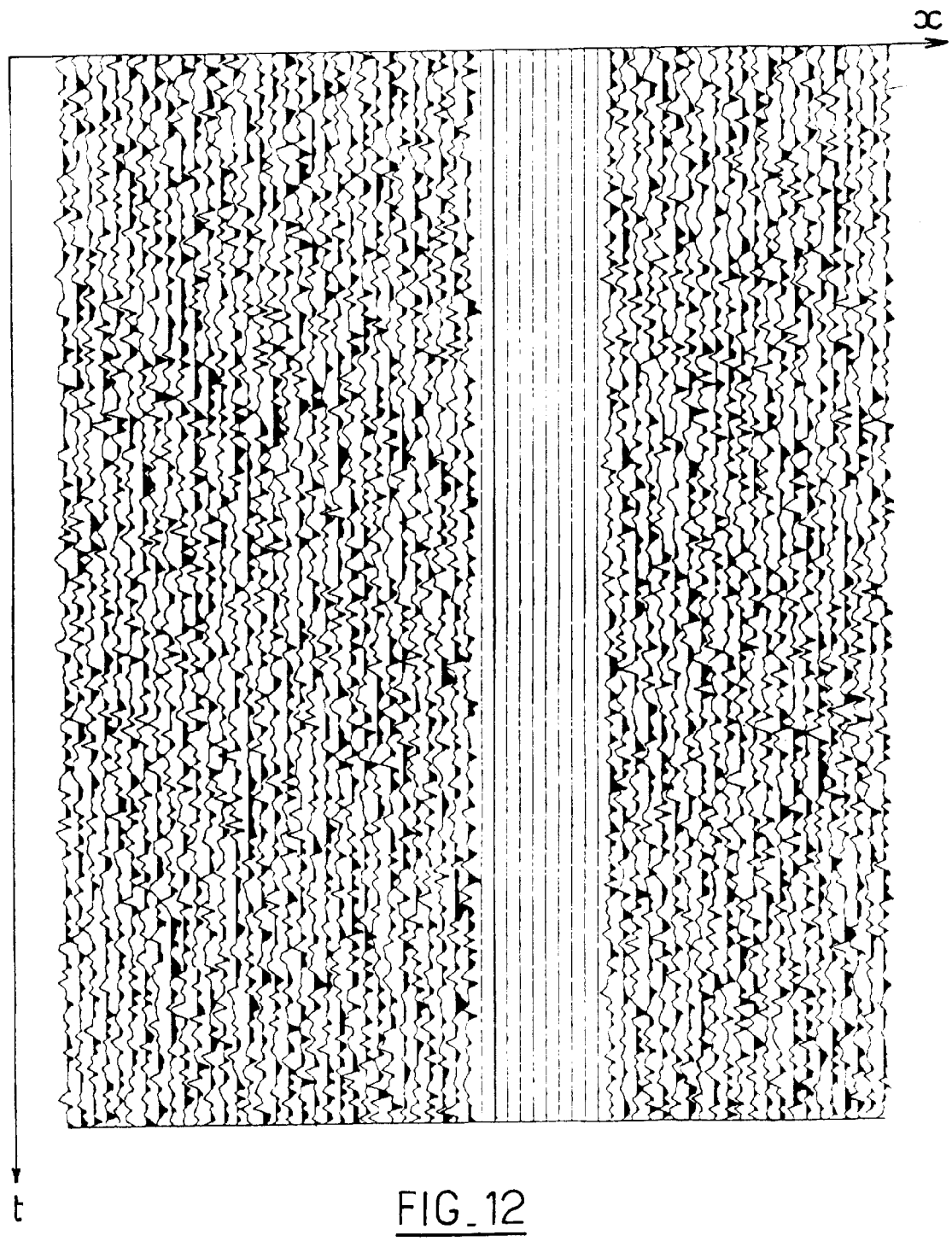
FIG_12

SEISMIC PROSPECTION METHOD WITH APPLICATION OF A SELF-DECONVOLUTED PREDICTION ERROR FILTER

The present invention relates to seismic prospection, and in particular to a method of attenuating noise affecting seismic traces.

The general principle of seismic prospection consists in using a seismic source to cause a disturbance in the sub-soil, and in using sensors (geophones or hydrophones) to record seismic data so as to deduce therefrom information about the geology of the sub-soil, in particular so as to detect the presence of hydrocarbons.

The sensors are usually regularly distributed at the nodes of a grid in space, and the recordings y(t) as a function of time t of the signals picked up by the sensors, also known as "seismic traces", are grouped together and juxtaposed as a function of the x coordinate values of the sensors over the grid (where x is a space coordinate), to form a seismic section t-x constituted by seismic data y(t,x).

Seismic data comprises useful information (e.g. a succession of reflected seismic echoes) embedded in overall background noise that is to be eliminated by appropriate processing, which processing must also accommodate the possibility that some of the traces in the seismic section may be missing. In practice, it can happen that some of the points of the grid do not provide any useful recording, either because it was not possible to install a sensor at the corresponding location, given the nature of the terrain, or because of a failure in the data acquisition installation, or indeed because the signal delivered by a particular sensor was saturated during recording by a very loud noise.

To eliminate noise, seismic data can be processed in an f-x plane using Y(f,x) data after applying the Fourier transform to the initial seismic data y(t,x) for the time variable t, or in an f-k plane for data Y(f,k) after applying the Fourier transform to the data Y(f,x) for a space variable x, where f designates a frequency variable, and where k designates a wave number variable.

It is common practice to distinguish noise that is non-coherent, random, and of a physical origin that is usually not identified (e.g. due to natural phenomena such as swell or microseisms), from noise that is coherent, and usually generated by physical phenomena that are identified such as a particular mode of seismic wave propagation (e.g. waves propagating at the surface), which noise needs to be eliminated because it contains no useful information concerning the sub-soil or because it would be too difficult to extract any useful information it does contain (due to so-called "multiple" reflections).

Numerous methods have been proposed for processing seismic data in order to attenuate noise, and those methods can be classified in several broad categories, depending on whether or not they are intended more particularly to eliminate noise of localized nature.

In a first type of method, known as a "deterministic" attenuation method, it is conventional to use the f-k plane in the hope that noise affecting the seismic data Y(f,k) can be identified and located in a particular region of that plane. As an example, noise propagating at constant speed appears as a straight line in the f-k plane and can be eliminated by simple filtering relating to the wave number variable k. More generally, data in the f-k plane is processed by being multiplied by a so-called "projective" filter whose value is ideally equal to 0 in regions where noise is assumed to be present (attenuation domain of the filter) and equal to 1 elsewhere (pass domain of the filter). It is nevertheless necessary to provide a broad transition between the pass and attenuation domains of the filter in order to restrict the extent thereof in the t-x seismic section, since otherwise there are side effects when the filter goes beyond the seismic section and the missing data is taken as being equal to zero (which is equivalent to setting certain coefficients of the filter to zero and thus to deteriorating performance). The side effects are particularly troublesome in the space domain where the number of samples, which corresponds to the number of traces, is particularly small. Selecting a broad transition, which corresponds to a small extent in the space domain thus leads to a filter that is insufficiently selective, i.e. in order to attenuate a given noise in the f-k plane, a non-negligible portion of the useful signal located in its vicinity is also attenuated. American patent U.S. Pat. No. 5,067,112 proposes remedying the drawbacks of conventionally performed filtering in the f-k plane by performing wave number filtering in the f-x plane. Nevertheless, the method described applies only to the special case where for each frequency of the f-x plane there is only one wave number $k_0$ to be removed, and also the non-recursive filter used has the dual drawbacks of being lengthy to apply and of being accompanied by side effects when high wave number selectivity is sought.

A second type of method, also known as the "statistical" attenuation method, is applicable when information is not available concerning the localization of the noise in the seismic section. In the article "Random noise reduction" by L. L. Canales, and published in "Expanded Abstracts of the 54th Annual SEG Meeting", Atlanta, 1984, proposals are made to perform "predictive" filtering in the f-x plane. According to the author of that article, the noise affecting a seismic section can be isolated from the remainder of the seismic data by applying a prediction error filter for the space variable x to the seismic data. The coefficients of the filter are chosen to minimize the noise energy that results from applying the filter to the data. The filtering proposed by Canales is not of the projective type since it does not eliminate data assumed to contain noise only, and it cannot be equal to one over a given frequency band. Unfortunately, any method of attenuating noise and preserving useful signals ought to be of the projective type: when the data contains noise only, it should be multiplied by zero so as to be eliminated, and in the opposite circumstances it should be multiplied by one so as to be conserved intact. In the method proposed by Canales, the seismic data is subjected to considerable degradation.

A third type of method, as proposed in particular in U.S. Pat. No. 5,182,729 (Duren et al.) consists in using a projection matrix to separate additive noise from a signal that is assumed to be perfectly predictable. That type of method is based on the following considerations:

Assume N seismic samples y(0), . . . , y(N) where N is an integer, corresponding to the sum of a perfectly predictable signal $y_0(0)$, . . . , $y_0(N)$ plus noise e(0), e(N).

The predictability of $y_0=[y_0(0), y_0(1), \ldots, y_0(N)]^T$ (where $^T$ designates the operation of transposing the matrix) for a prediction error filter a having p+1 coefficients a(0), a(1), . . . , a(p) where p is an integer less than N, means that $y_0$ belongs to a sub-space $Ay_0=0$, where A is the following matrix having N+1 columns and N+1−p rows:

$$A = \begin{bmatrix} a(p) & \ldots & a(0) & 0 & \ldots & \ldots & 0 \\ 0 & a(p) & \ldots & a(0) & 0 & \ldots & 0 \\ \ldots & \ldots & \ldots & \ldots & \ldots & \ldots & \ldots \\ 0 & \ldots & \ldots & 0 & a(p) & \ldots & a(0) \end{bmatrix} \quad \text{(I)}$$

It is then possible to estimate $y_0$ by projecting $[y(0), y(1), \ldots, y(N)]^T$ onto that sub-space. In linear algebra this can be written as follows:

$$y_0 = (I - A^*(AA^*)^{-1}A)y \quad \text{(II)}$$

$$e = A^*(AA^*)^{-1}Ay \quad \text{(III)}$$

where I is the unit matrix, $A^*$ is the conjugate transpose of A, and e is the estimated additive noise.

Inverting the matrix $AA^*$ then requires matrix computation to be performed which puts a very severe limit on the practicality of such methods. When performing seismic processing, the cost in computation time and in memory space for inverting a matrix of dimension equal to that of the data is in general prohibitive, since enormous quantities of data are processed.

In the Duren et al. patent, a projection matrix of the same type as equation III is applied. This is viable insofar as he considers a special case where the number of data samples N is 3 to 5.

The invention seeks to remedy the drawbacks of prior art methods.

It uses only filter type methods on the data, since they are much cheaper than matrix type methods.

Filter type methods differ from matrix type methods by the following criterion: in matrix type methods, computing the coefficients of the matrix to be applied to the data requires knowledge of the number of samples and requires a set of coefficients to be computed and stored for each data sample. Filter type methods are characterized by the fact that they do not require knowledge of the number of data samples when computing the coefficients. The coefficients are computed once only, and for all of the data.

It will be understood that for seismic processing, when a very large mass of data is manipulated, filter type methods are particularly advantageous compared with matrix methods.

The invention teaches how to perform an approximate projection by filtering. Filters also suffer from the drawback of side effects. This invention also teaches how to avoid them, without increasing computation costs, by using the non-steady filtering structure.

Consequently, throughout the present text, the term "filtering" covers an operation that consists in computing output samples on the basis of linear combinations of input samples using a previously computed set of coefficients that are identical for the various input samples.

When an output sample is computed using input samples only, then the filtering is said to be "non-recursive".

When an output sample is computed from linear combinations of input samples and of previously computed output samples, then the filtering is said to be "recursive".

The term "non-steady" filtering is used to mean filtering where the coefficients are not steady and are recomputed on each occasion for the initial input samples until they converge on coefficient values that are used thereafter in steady manner for the other input samples. The number of sets of coefficients to be computed is greater than one but it remains small and is in any event independent of the number of data samples.

The term "matrix operation on data" is used to mean an operation which consists in computing as many sets of coefficients as there are data samples.

The invention provides a seismic prospective method in which:

a seismic disturbance is caused to take place in the sub-soil;

sensors are used to pick up sampled seismic data $y=[y(0), \ldots, y(N)]^T$ where N is an integer, said data containing a signal $y_0$ that is to be isolated and that is embedded in additive noise;

the seismic data is subjected to filtering in the time domain or the frequency domain to obtain filtered data in which the signal to be isolated is absent;

the filter data is subtracted from the initial seismic data to obtain processed data $y_0(0), \ldots, y_0(N)$ corresponding to the signal $y_0$ without additive noise;

the data acquired in this way is processed to deduce therefrom useful information about the geology of the sub-soil;

the filter used for filtering the seismic data being a self-deconvoluted prediction error frequency filter M(f) such that:

$$M(f) = |A(f)|^2 / R(f)$$

or an equivalent filter in the time domain,

A(f) being the spectrum of a prediction error filter $\alpha$ having p+1 coefficients $a(0), \ldots, a(p)$ where p is an integer smaller than N, $\alpha$ being previously selected for best cancelling by convolution of the signal $y_0$ that is to be isolated, R(f) being a precolorized self-correlation of said prediction filter $\alpha$ satisfying:

$$R(f) = |A(f)|^2 + \epsilon^2 |B(f)|^2$$

where $\epsilon$ and B(f) are respectively a precolorization factor and a precolorization filter previously selected as a function of the selectivity desired for the filtering.

As will be understood below, such filtering is approximately projective.

In addition, the method makes it possible to perform "deterministic" attenuation with a selective filter without encountering side effects, and also "statistical" attenuation by projective type filtering.

The invention will be better understood on reading the following detailed description of non-limiting implementations of the method of the invention, and on examining the accompanying drawings, in which:

FIG. 9 shows the seismic section of FIG. 4 with 10 traces missing;

FIG. 10 shows a restored seismic section for implementing the method of the invention;

FIG. 11 shows the predictable portion of the restored seismic data of FIG. 10; and FIG. 12 shows the non-predictable portion of the restored seismic data of FIG. 10.

In the description below, the invention is applied to seismic data y(t) as a function of the time variable t. The seismic data y(t) is assumed to have been recorded in digital form and to have been made discrete with a sampling pitch $\Delta\tau = 1/f_e$ where $f_e$ is the sampling frequency. In the description below, $\Delta\tau$ is taken to be equal to 1 to simplify the notation. The invention can naturally be applied in the same manner to seismic data y(x) given as a function of the space variable x.

When applied to data y(t), the invention makes it possible to isolate noise signals at a particular frequency such as 50 Hz or 60 Hz and affecting the seismic data, in order to eliminate said noise signals, and when applied to the data y(x), the invention serves to remove disturbances due, for example, to the configuration in space of the sensors over the grid.

The integer variable n is used in the description below to designate seismic data samples that have been made discrete. When the invention is applied to seismic data that is a function of the time variable t, n lies in the range 0 to N, with the total number of samples recorded by a sensor over the duration of the measurement being equal to N+1. When the invention is applied in the seismic section t-x or the plane f-x under consideration to seismic data that is a function of the space variable x, then n lies in the range 0 and the total minus one of juxtaposed traces in the t-x seismic section under consideration.

In the description below, it is assumed in general, that the discrete seismic data samples y(n) as extracted from a seismic section obtained in a manner that is known per se (step 1 in FIG. 1), are capable of being resolved into a predictable component $y_0(n)$ that is to be isolated and a non-predictable component e(n):

$$y(n) = y_0(n) + e(n) \qquad (1)$$

Figure 1:
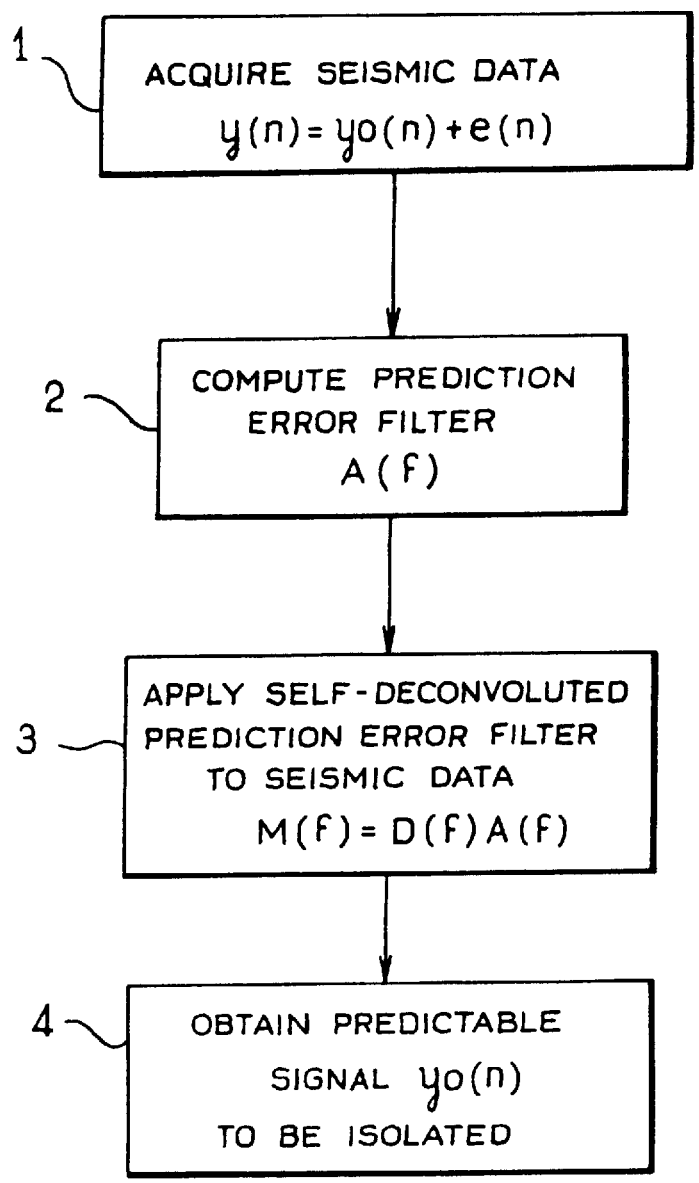
FIG. 1 is a block diagram of the method of the invention.

In accordance with the invention, a prediction error filter α of length p is computed, i.e. having p+1 coefficients, to provide best cancellation of $y_0(n)$ (step 2 in FIG. 1). To facilitate understanding the invention, it is assumed here that the prediction error filter α cancels $y_0(n)$ completely, i.e. that the p+1 coefficients a(0), a(1), . . . , a(p) of the filter α are such that:

$$a(0)y_0(n) + a(1)y_0(n-1) + \ldots + a(p)y_0(n-p) = 0 \qquad (2)$$

with a(0)=1

In the frequency domain, obtained by applying the Fourier transform for the time variable to y(n), e.g. by a fast Fourier transform method that implements the following operation:

$$Y(m') = \sum_{m=0}^{M-1} y(m) e^{2j\pi mm'/M}$$

$$m' = 0, \ldots, M-1$$

where M is an integer selected to be greater than the number of time samples in the signal, equations (1) and (2) can be written as follows:

$$Y(f) = Y_0(f) + E(f) \qquad (1')$$

$$A(f)Y_0(f) = 0 \qquad (2')$$

where uppercase letters are used to designate e(n) and $y_0(n)$ after applying the Fourier transform and where A(f) is the spectrum of the prediction error filter α.

From (1') and (2'), it can be deduced:

$$A(f)E(f) = A(f)Y(f) \qquad (3')$$

Let D(f) be a deconvolution operator for A(f).

In accordance with the invention, the self-deconvoluted prediction error filter D(f)A(f) is applied to the data Y(f) (step 3 of FIG. 1), giving:

$$E(f) = D(f)A(f)Y(f) \qquad (4')$$

Thereafter (step 4 of FIG. 1) it is possible to isolate the useful signal $Y_0(f)$ by applying:

$$Y_0(f) = Y(f) - E(f).$$

In practice, the prediction error filter α is never exactly invertible and a deconvolution operator D(f) cannot be found such that D(f)A(f)=1. In practice, the deconvolution operator D(f) is an approximate inverse operator, e.g. determined by minimizing:

$$|D(f)A(f) - 1|^2 + \epsilon_2 |B(f)|^2 |D(f)|^2$$

This expression is at a minimum for $$D(f) = \overline{A(f)}/R(f) \qquad (5')$$

with $$R(f) = |A(f)|^2 + \epsilon^2 |B(f)|^2 \qquad (6')$$

In this expression, ‾‾ designates the complex conjugate, and ϵ and B(f) govern the computation and are selected by the person skilled in the art as a function of the margin of error that can be accepted in computing D(f). ϵ is a scalar referred to as a "precolorization factor", and B(f) is a filter referred to the "precolorization filter". In the time domain, the precolorization filter b is of finite length q, preferably less than p, with coefficients b(0), . . . , b(q) and b(0)=1. When B(f)=1, ϵ is called the "prebleaching factor".

Equation (4') can also be written:

$$E(f) = M(f)Y(f) \qquad (7')$$

with $$M(f) = |A(f)|^2 / [|A(f)|^2 + \epsilon^2 |B(f)|^2] \qquad (8')$$

i.e.

$$M(f) = |A(f)|^2 / R(f) \qquad (9')$$

R(f) is a filter referred to as the "precolorized self-correlation" filter for the prediction error filter α.

Thus, the filter M(f) obtained and applied by the invention to the seismic data Y(f) is analogous to a projective type of filter, since:

$$M(f) = 0 \text{ if } A(f) = 0$$

$$M(f) \approx 1 \text{ if } |A(f)| \gg \epsilon |B(f)|$$

From equation (9'), computing the self-deconvoluted prediction error filter M(f) that is to be applied to the seismic data requires knowledge of the prediction error filter A(f) and of the precolorized self-correlation filter R(f). After the prediction error filter α and the precolorized self-correlation filter has been computed, the filter M(f) to be applied to the data in the frequency domain is given by the same equation (9'). It is specified below how to apply it in the time domain.

It is recalled that in a manner known per se to the person skilled in the art, the convolution of two sequences x(M1), ..., x(M2) and y(N1), ..., y(N2) is the sequence z(M1+N1), ..., z(M2+N2) such that:

$$z(i) = \sum_j x(j)y(i-j)$$

The following notation is used below:

$$z(i)=x(i)*y(i)$$

to designate this convolution operation.

The correlation operation, i.e. the convolution of the sequence x(i) with the reverse conjugate sequence yr(i) such that:

$$yr(i)=\overline{y(-i)} \text{ for } i=-N2,\ldots,-N1$$

is designated by the notation:

$$z(i)=x(i)*\overline{y(-i)}$$

The notation $\delta(i)$ is used below for a sequence such that $\delta(0)=1$ and $\delta(i)=0$ if $i \neq 0$.

DETERMINISTIC COMPUTATION OF THE PREDICTION ERROR FILTER AND OF THE PRECOLORIZED SELF-CORRELATION FILTER

In a first implementation of the method of the invention, the p+1 coefficients of the prediction error filter a are computed from known physical parameters of the signal $y_0$ that is to be isolated, and preferably the p+1 coefficients of the prediction error filter α are computed from the medium of the frequency spectrum $Y_0(f)$ of the signal $y_0$ (set of values of f for which $Y_0(f)\neq 0$).

The prediction error filter α can be computed in several ways, when the spectrum medium of the predictable signal $y_0$ that is to be isolated from the seismic data y(n) is known, as is the case for example when it is desired to eliminate from the seismic data any noise of frequency 50 Hz or 60 Hz due to electrical installations. In the invention, for deterministic filtering, it is assumed that a signal is band-limited in terms of the quasi-predictability of the signal.

Signal $y_0$ has a Spectrum of Isolated Lines

In this example, the signal $y_0$ to be isolated in the seismic data y(n) is assumed to have a spectrum $Y_0(f)$ constituted by p lines $f_q(q=1,\ldots,p)$.

For each line of frequency $f_q$, an elementary prediction error filter $a_q$ of length 1 is defined having two coefficients $a_q(0)$ and $a_q(1)$ given as follows:

$$a_q(0)=1$$

$$a_q(1)=-e^{-2j\pi f_q}$$

The coefficients a(0), a(1), ..., a(p) of the overall prediction error filter α to be applied to the seismic data y(n) is then defined as follows:

$$a(i)=a_1(i)* a_2(i) * \ldots * a_p(i)$$

Similarly, for each integer q the precolorized auto-correlation $r_q$ with prebleaching and of length 2 is also computed, having three coefficients:

$$i=-1, 0, 1 \quad r_q(1)=a_q(i)* \overline{a_q(-i)}+\epsilon^2\delta(i)$$

and then the following is computed $$r(i)=r_1(i)* r_2(i)* \ldots * r_p(i)$$

where a(i) and r(i) make it possible, after applying the Fourier transform, to construct a filter M(f) using equation (9') which rejects the p frequencies $f_q$. $\epsilon$ governs the selectivity of the filter; the smaller $\epsilon$, the more selective the filter.

The Signal $y_0$ has a Non-Zero Spectrum $Y_0(f)$ for at least One Frequency Range In this example the signal $y_0$ to be isolated is assumed to have a non-zero spectrum $Y_0(f)$ over at least one frequency range.

Least Squares Method

In this first method, the coefficients a(0), a(1), ..., a(p) of the prediction error filter α, of spectrum A(f) are determined by a least squares method, i.e. they are selected such that the $\int^1_0 W(f)|A(f)|^2 df$ is a minimum, given that a(0)=1 and W(f) is a function that is equal to 1 when the frequency f is in a frequency range where the spectrum $Y_0(f)$ of the signal $y_0$ to be isolated is non-zero, and is 0 elsewhere.

In a manner known to the person skilled in the art, minimizing the above-defined integral is equivalent to solving a Toeplitz system in the time domain and after applying the inverse Fourier transform W(f) to obtain w(i) in the time domain. The Toeplitz system is formed using w(-p), ..., w(p), e.g. by means of a Levinson algorithm without a second member.

The Toeplitz matrix M of coefficients m(i,j) is computed by:

$$m(i,j)=w(i-j) \text{ for } i,j=0,\ldots,p$$

and in a manner known per se the following is solved $$\sum_{j=0}^{p} m(i,j)a(j) = \sigma^2\delta(i)$$

where a(0)=1, and σ is a scalar.

When computing the precolorized self-correlation by equation (6'), it is preferable to use B(f)=1 and a prebleaching factor $\epsilon$ which is large compared with the values of the modulus |A(f)| in said frequency ranges.

Method using Chebyshev Polynomials

In a variant, which is preferable when the method of the invention is applied to processing seismic data y(t) or y(x) depending on a single time variable t or a single space variable x only, the spectrum medium $Y_0(f)$ is split up in a second method into Q frequency ranges:

$$[f_q-\Delta f_q, f_q+\Delta f_q]$$

$\Delta f_q$ being the half-width of the sub-range centered on the frequency $f_q$.

Q functions are defined as follows:

$$S_q(f)=e^{-j\pi pf}T_{pq}[\sin(\pi(f-f_q))/\sin(\pi\Delta f_q)]$$

where $T_{pq}$ is the Chebyshev polynomial of the first kind of order $p_q$, defined recursively for a variable $\alpha$ as follows:

$$T_0(\alpha)=1,$$

$$T_1(\alpha)=\alpha,$$

$$T_p(\alpha)=2\alpha T_{p-1}(\alpha)-T_{p-2}(\alpha)$$

It can be shown that:

$$S_q(f) = \sum_{m=0}^{pq} s_q(m)e^{-j2\pi mf}$$

I.e., after applying the inverse Fourier transform of $S_q(f)$, the signal $S_q(i)$ in the time domain is obtained in which the only non-zero coefficients are $S_q(0), \ldots, S_q(P_q)$ Thereafter, the elementary prediction error filter coefficients $a_q$ are computed (after writing $\lambda_q=1/S_q(0)$) by:

$$a_q(i)=S_q(i)\lambda_q \text{ for } i=0, \ldots, p_q$$

and the prediction error filter a by:

$$a(i)=a_1(i)*a_2(i)* \ldots * a_Q(i)$$

The elementary precolorized self-correlations $r_q(i)$ are computed with $\epsilon_q \gg \lambda_q$ by:

$$r_q(i)=a_q(i)*\overline{a_q(-i)}+\epsilon^2\delta(i)$$

and then the precolorized self-correlation r(i) by:

$$r(i)=r_1(i)*r_2(i)* \ldots * r_Q(i)$$

Figure 2:
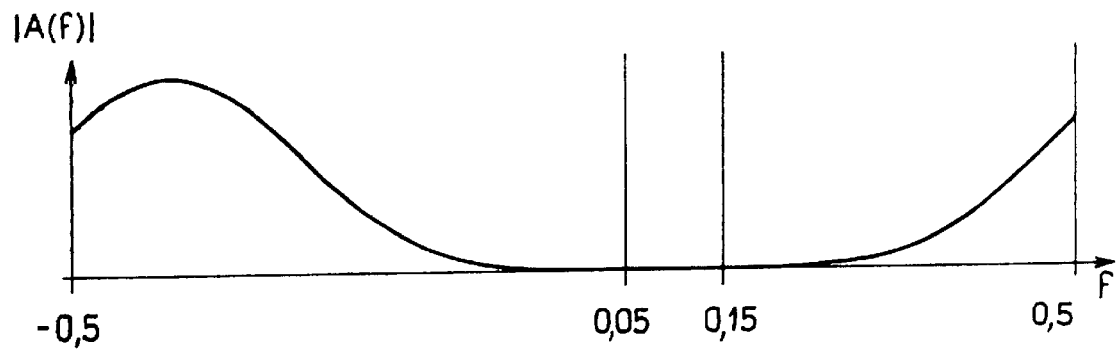
FIG. 2 shows how the spectrum modulus of a prediction error filter varies as a function of frequency.

FIG. 2 is a plot of the modulus $|A(f)|$ of the spectrum A(f) as a function of frequency for $Y_0(f)$ of medium centered on $f_1 = 1/10$ with $\Delta f_1 = 1/20$. It will be observed that the resulting prediction error filter $\alpha$ has a spectrum of modulus $|A(f)|$ that is small in the frequency range of the spectrum medium $Y_0(f)$.

Figure 3A:
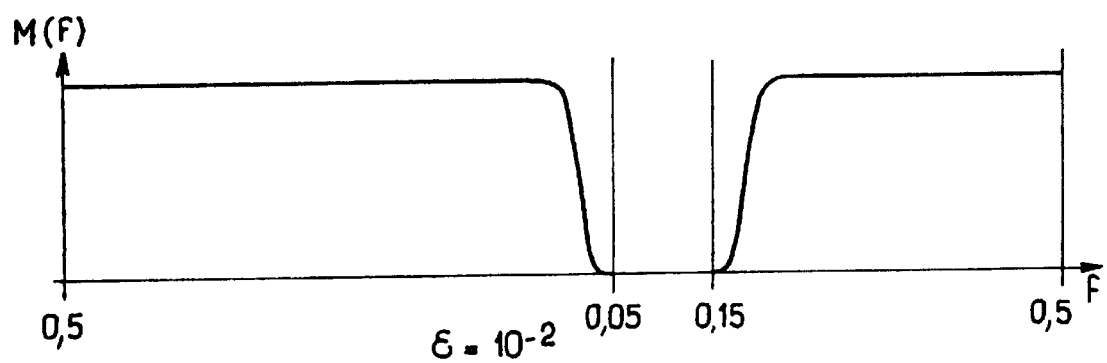
FIG. 3A shows the spectrum of the self-deconvoluted prediction error filter corresponding to FIG. 2, for a given value of a computation parameter $\epsilon$.
Figure 3B:
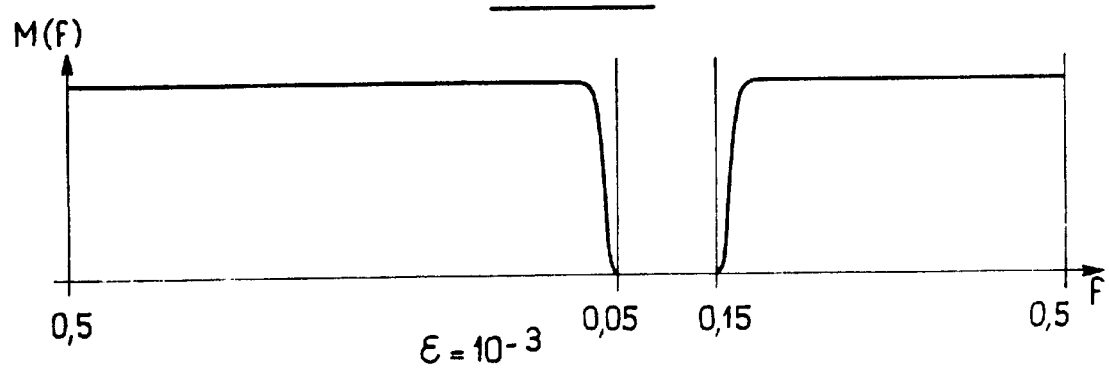
FIG. 3B shows how the self-deconvoluted prediction error filter of FIG. 3A varies for a different value of the computation parameter $\epsilon$.

FIGS. 3A and 3B are respective plots of the spectrum M(f) for two values of the prebleaching factor $\epsilon$ respectively equal to $10^{-2}$ and $10^{-3}$. It can be seen that the parameter $\epsilon$ serves to control the slope of the filter M(f).

It is described below how to compute the prediction error filter $\alpha$ in "statistical" manner and in accordance with the invention when the predictable signal $y_0$ to be isolated is not known or identifiable a priori from the seismic data.

There follows below a description of various ways in accordance with the invention of applying the self-deconvoluted prediction error filter to seismic data.

APPLICATION OF THE SELF-DECONVOLUTED PREDICTION ERROR FILTER TO SEISMIC DATA

Frequency Filtering Process

A first way of applying the self-deconvoluted prediction error filter to seismic data consists in applying the filter M(f) as defined above by equation (9') directly to seismic data in the frequency domain.

Non-Recursive Time Filtering Process

A second way of applying the self-deconvoluted prediction error filter consists in performing non-recursive time filtering.

The precolorized self-correlation $R(f)=|A(f)|^2+\epsilon^2|B(f)|^2$ in the frequency domain has its equivalent in the time domain that is written as follows:

$$r(i)=a(i)*\overline{a(-i)}+\epsilon^2 b(i)*\overline{b(-i)} \tag{10}$$

Preferably, in order to avoid excessive computation time, the precolorization filter length b(i) is chosen to be shorter than the length of $\alpha$ so that the set of indices for which r(i) is non-zero is limited to $-p, \ldots, 0. \ldots, P$.

After computing the precolorized self-correlation r(i), the equivalent g(i) in the time domain of G(f) is computed that satisfies $R(f)=1/|G(f)|^2$ by solving a Toeplitz system formed on the basis of the precolorized self-correlation r(i), by means of a Levinson algorithm, for example: the matrix M is computed that has the so-called "Toeplitz" form, defined by its coefficients m(i,j) being equal to:

$$m(i,j)=r(i-j) \text{ for } i,j=0, \ldots, L_g$$

satisfying $$\sum_{j=0}^{Lg} m(i,j)g(j) = \delta(i)$$

with $\delta(0)=1$ and $\delta(i)=0$ for $i=1, \ldots, L_g$ and for $L_g$ selected to obtain the desired convergence of $1/|G(f)|^2$ on R(f).

Thereafter the following is computed:

$$e(n)=\overline{a(-1)}*\overline{g(-i)}*g(i)*a(i)*y(n) \tag{11}$$

The non-recursive time filtering process can be summed up as follows (process No. 1):
1) computing r(i), the precolorized self-correlation of a(i):

$$r(i)=a(i)*\overline{a(-1)}+\epsilon^2 b(i)*\overline{b(-i)}$$

2) computing g(i) on the basis of r(i), where g(i) is such that $r(i)*g(i)*\overline{g(i)} \approx \delta(i)$ with $\delta(i)=1$ if $i=0$ and $\delta(i)=0$ otherwise
3) computing $$e(n)=\overline{a(-i)}*\overline{g(-i)}*g(i)*a(i)*y(n).$$

Thereafter the signal to be isolated is computed $y_0(n)=y(n)-e(n)$.

g(i) is of length $L_g+1$ which may be large if $\epsilon$ is small. In which case, applying g(i) to seismic data is expensive in computation time.

Recursive Time Filtering Process

To remedy that, the precolorized self-correlation R(f) which is of finite length can be factored by writing the self-correlation r(i) of time length p as the self-correlation of a signal c(i) of length p and at minimum phase.

A third way of applying the self-deconvoluted prediction error filter then consists in performing recursive time filtering which has the advantage, as explained above, of requiring shorter computation time than does non-recursive time filtering.

A filter is sought having coefficients c(i) (i=0, ..., p) and referred to below as the "damped prediction error filter" such that the following applies:

$$r(i)=a(i)*\overline{a(-i)}+\epsilon^2 b(i)*\overline{b(-i)} \approx c(i)*\overline{c(-i)} \tag{12}$$

which is a translation into the time domain of equation (6') in the frequency domain:

$$R(f)=|A(f)|^2+\epsilon^2|B(f)|^2=|C(f)|^2$$

The coefficients c(i) are preferably determined by the following iterative process of recursive time filtering (process No. 2) (reference can be made to the article by G. Kunetz "Généralisation des opérateurs d'antirésonance àun nombre quelconque de réflecteurs" [Generalization of anti-resonant operators to an arbitrary number of reflectors] published in Geophysical Prospectory, Vol. 12, pp. 282–289):

1) Initializing Computation Variables ep and em $$ep(0,i) = r(i) \quad \text{for } i = 0, \ldots, p$$
$$em(0,i) = r(i+1) \quad \text{for } i = 0, \ldots, p-1$$
$$em(0,p) = 0$$

2) Iterations

For j over the range 0 to L, where L is the number of iterations set:

$$\kappa(j) = -em(j,0)ep(j,0)$$
$$ep(j+1,i) = ep(j,i) - \kappa(j)em(j,i) \quad \text{for } i = 0, \ldots, p$$
$$em(j+1,i) = em(j,i+1) - \kappa(j)ep(j,i+1) \quad \text{for } i = 0, \ldots, p-1$$
$$em(j+1,p) = 0$$

End of j loop.

It will be observed that the terms K(j) are computed such that $$em(j+1,-1)=0$$

3) Normalization

Thereafter c(i) is computed as follows:

$$c(i) = ep(L,i)/\sqrt{ep(L,0)} \quad \text{for } i = 0, \ldots, p$$

L is selected to give the looked-for accuracy in the asymptotic relationship $r(i)=c(i)*\overline{c(-i)}$.

Given c(i) and a(i), u(n) is computed for n over the range 0 to N as follows:

$$u(n) = \left[ \sum_{i=0}^{p} a(i)y(n-i) - \sum_{i=1}^{p} c(i)u(n-i) \right]/c(0) \quad (13)$$

then, knowing u(n), e(n) is computed for n over the range N to 0 as follows:

$$e(n) = \left[ \sum_{i=0}^{p} \overline{a(i)}u(n+i) - \sum_{i=1}^{p} \overline{c(i)}e(n+i) \right]/\overline{c(0)} \quad (14)$$

u(n) is obtained above by "up recursive" filtering which is written below in symbolic notation:

$$u(n) = \left[ \frac{a(i)}{c(i)} \right] * y(n)$$

e(n) is obtained above by "down recursive" filtering which is written below in symbolic notation:

$$e(n) = \left[ \frac{\overline{a(-i)}}{\overline{c(-i)}} \right] * u(n)$$

The following notation is also used below:

$$u(n) = \left[ \frac{y(n)}{c(i)} \right]$$

to designate the operation:

$$u(n) = \left[ \frac{\delta(i)}{c(i)} \right] * y(n)$$

The person skilled in the art will observe that c(i) is at minimum phase and $\overline{c(-i)}$ at maximum phase, thereby making it possible to obtain up and down recursive filtering that is stable in each case.

The non-recursive time filtering process can be summed up as follows (process No. 3):

1) Computing r(i), the precolorized self-correlation of a(i) as follows:

$$r(i)=a(i)*\overline{a(-i)}+\epsilon^2 b(i)*\overline{b(-i)}$$

2) Computing the damped prediction error filter c(i) (i=0, . . . , p) satisfying:

$$c(i)*\overline{c(-i)} \approx r(i)$$

3) Computing u(n) by up recursive filtering:

$$u(n) = \left[ \sum_{i=0}^{p} a(i)y(n-i) - \sum_{i=1}^{p} c(i)u(n-i) \right]/c(0)$$

4) Computing e(n) by down recursive filtering:

$$e(n) = \left[ \sum_{i=0}^{p} \overline{a(i)}u(n+i) - \sum_{i=1}^{p} \overline{c(i)}e(n+i) \right]/\overline{c(0)}$$

The signal to be isolated $y_0(n)$ is then computed by $y_0(n)=y(n)-e(n)$.

Non-Steady Recursive Filtering Process

A fourth way of applying the self-deconvoluted prediction error filter in accordance with the invention consists in performing filtering that we call "non-steady recursive" filtering which has the advantage of reducing side effects.

The quasi-predictability of $y_0$ can be written, in matrix form:

$$Ae+\epsilon B\rho=Ay \quad (15)$$

where A and B are matrices constructed from filters a and b and ρ is a computation vector referred to as the "innovation vector", precolorized by B and multiplied by the precolorization factor ε. If ε is zero, then $y_0$ is perfectly predictable.

Writing out matrix equation (15) explicitly gives:

$$\begin{vmatrix} a(p) & \ldots & a(0)0 & & 0\ldots 0 \\ 0 & & a(p) & \ldots & a(0) \\ 0\ldots 0 & & & \ldots & & \ldots a(p)a(0) \\ & & 0 & & 0 \; 0 \end{vmatrix} \begin{vmatrix} e(0) \\ e(1) \\ e(N) \end{vmatrix} +$$

$$\epsilon \begin{vmatrix} b(q) & \ldots & b(0) & 0 & \ldots & 0 \\ 0 & & b(q) & \ldots & b(0) & 0 \\ \ldots & & & \ldots & \\ 0 & 0 & b(q) & \ldots & b(0) \end{vmatrix} \begin{vmatrix} p(0) \\ p(1) \\ \ldots \\ p(N) \end{vmatrix} =$$

$$\begin{vmatrix} a(p) & \ldots & a(0) & & 0 \; 0 \\ & \ldots & & & \\ 0 & 0 & a(p) & \ldots & a(0) \end{vmatrix} \begin{vmatrix} y(0) \\ y(1) \\ y(N) \end{vmatrix}$$

e and ρ are searched for by minimizing:
$$\beta=e*e+\rho*\rho$$

where * designates the conjugate transpose of a matrix or of a vector.

β is at a minimum for e taken as equal to $e_{min} = A^*(AA^* + \epsilon^2 BB^*)^{-1}Ay$ and ρ taken equal to $\rho_{min} = \epsilon B^*(AA^* + \epsilon^2 BB^*)_{-1}Ay$ β is then $\beta_{min} = e_{min}^* e_{min} + \rho_{min}^* \rho_{min}$ which, writing out the values for $e_{min}$ and $\rho_{min}$ in full is:

$$\beta_{min} = Y^*A^*(AA^* + \epsilon^2 BB^*)^{-1}Ay$$

Let s =Ay which is the result of convolution of y by A and $v = R^{-1}s$ with $R = AA^* + \epsilon^2 BB^*$.

To find v such that Rv=s, the person skilled in the art will observe that a linear system needs to be solved, R being a complex p-band Toeplitz matrix formed on the basis of the self-correlation of a(i) plus $\epsilon^2$ times the self-correlation of b(i). One way of finding v consists in using the Cholesky decomposition of R:

R=CC* (C being a smaller p-band triangular matrix).

However that is a matrix operation on data. The dimension of R is N+1-p and thus of order N which is the dimension of the data. However one of the characteristics of the invention is to observe that by adding precolorization, it is possible to approximate a matrix operation on the data by non-steady filtering for the initial application points. This non-steady filtering structure makes it possible to combine the low cost of filtering with the absence of side effects.

Implementing this non-steady filtering structure in the context of Cholesky decomposition consists in stopping the resolution after the L first columns of the matrix C have been computed, with the matrix being notionally completed by $c_{i+j,j} = C_{i+L,L}$ for j>L and i=0, . . . ,p. We call this method partial Cholesky decomposition.

The number L of steps after which the computation can be stopped with acceptable error depends on the pre-colorization factor and under no circumstances on the number of data samples N. The greater the pre-colorization factor, the smaller the value of L that can be selected.

In this respect, it may be observed that it is common practice in digital computation to add a small factor to the diagonal of a positive matrix, which factor is of the same order as the numerical precision of the computer used (generally $10^6$) so as to guarantee that the Cholesky decomposition is stable, numerically. The precolorization self-correlation used in the proposed method is of a different order of magnitude, being about $10^2$ to $10^1$, and seeks to make it possible to use the non-steady filtering structure to approximate the inverse of the matrix with the help of a small number of sets of coefficients.

In a variant, and preferably, the coefficients of the non-steady filter are not computed by partial Cholesky decomposition, but the coefficients ep(i,j) are computed by a method referred to below as non-steady damped prediction error filter computation (process No. 5) where the coefficients ep(i,j) are related to $c_{i,j}$ by the relationship $c_{ij} = ep(j, i-j)/\sqrt{ep(j,0)}$, and the coefficients em(i,j) are internal variables of the process.

Initialization $ep(0,i) = r(i)$      for $i = 0, \ldots, p$ $em(0,i) = r(i+1)$      for $i = 0, \ldots, p-1$ $em(0,p) = 0$ Iterations For j over the range 0 to L, where L is less than or equal to N and is the number of iterations set by obtaining convergence of ep(j,i) regardless of i:

$\kappa(j) = -em(j,0)/ep(j,0)$ $ep(j+1,i) = ep(j,i) - \overline{\kappa(j)}em(j,i)$      for $i = 0, \ldots, p$ $em(j+1,i) = em(j,i+1) - \kappa(j)ep(j,i+1)$      for $i = 0, \ldots, p-1$ $em(j+1,p) = 0$ End of j loop.

It may be observed that the terms in K(j) are computed so that:

em(j+1,-1)=0

Normalization

For j over the range 0 to L $\xi = 1/\sqrt{ep(j,0)}$ $ep(j,i) = \xi \cdot ep(j,i)$     $i = 0, \ldots, p$ End of j loop.

The terms in ep are then notionally completed using ep(j,i)=ep(L,i) for j=L+1, . . . , N and i=0, . . . ,p.

By completing terms "notionally" we mean that when the notation ep(j,i) occurs subsequently, it should be replaced by ep(L,i) if j is greater than L. Naturally, when the method is implemented on a computer, there is no need to allocate memory space for storing all ep(j,i) for j>L, nor is there any need to allocate space for storing $c_{i,j}$ as notionally completed in the previous process. This shows clearly that processes No. 4 and No. 5 as described above are indeed non-steady filtering processes and not matrix computations on the data.

Process No. 2 for computing the damped predictor c(i) is equivalent to taking:

$c(i) = ep(L,i)$

Consequently, ep(j,i) can be considered as a non-steady damped prediction error filter.

To sum up, the preferred non-steady recursive filtering operation comprises the following steps (process No. 6):

1) Computing the precolorized self-correlation $r(i) = a(i)^* \overline{a(-i)} + \epsilon^2 b(i)^* \overline{b(-i)}$ 2) Using process No. 5 and r(i) to compute the non-steady damped prediction error filter:

ep(0, . . . , L; 0, . . . , p) notionally completed to ep(0, . . . , N; 0, . . . , p)

3) Computing $s(n-p) = \sum_{i=0}^{p} a(i)y(n-1)$ $n = p, \ldots, N$

4) Computing $$u(n) = \left[ s(n) - \sum_{i=1}^{i=\min(p,n)} ep(n-1,i)u(n-i) \right] / ep(n,0)$$

for $n = 0, \ldots, N - p$ for n=0, . . . , N–p

5) Computing $$v(n) = \left[ u(n) - \sum_{i=0}^{i=\min(p,N-p-n)} \overline{ep(n,i)}v(n+i) \right] / \overline{ep(n,0)}$$

for $n = N - p, \ldots, 0$ for n=N–p, . . . ,0

6) Computing $$e(n+p) = \sum_{i=\max(0,-n)}^{i=\min(p,N-p-n)} \overline{a(i)}v(n+i)$$

for $n = -p, \ldots, N - p$ for n=–p, . . . , N–p

Below, the same notation $u=C^{-1}s$ is used symbolically to designate computing u from s by a non-steady filtering method, independently of the method used, whether it be partial Cholesky decomposition (process No. 4) or the preferred method of process No. 5 and step 4) in process No. 6 above, or any other method that includes a step in which a number L of iterations is selected beyond which a steady approximation is made. In particular, the non-recursive filtering method (method No. 1) can also be generalized as a non-steady nonre-cursive filtering method. The Levinson algorithm when applied to a number of iterations equal to the number of data samples makes it possible to compute a matrix G such that: $R^{-1} \approx G^*G$ which makes it possible to write:

$$e = A^*G^*GAy \qquad (4)$$

This is a matrix operation on data. The teaching of the invention makes it possible to approximate this operation with non-steady filtering by stopping the Levinson algorithm after L iterations and notionally completing the matrix G.

The notation for computation of the non-steady recursive filter C such that $CC^* \approx R$ and application of said filter by $u=C^{-1}s$ could thus also be understood as computation of the non-steady non-recursive filter G such that $G^*G \approx R^{-1}$ and application of said filter by $u=Gs$.

Similarly, the notation $v=C^{*-1}u$ is used to designate computing v from u, independently of the method used, e.g. step 5) of process No. 4, but preferably by using step 5) of process No. 6.

When the prediction error filter $\alpha$ is not computed in deterministic manner, from the spectrum $Y_0(f)$ of the signal $y_0$, $\alpha$ is computed iteratively, in the "statistical" manner.

STATISTICAL COMPUTATION OF THE PREDICTION ERROR FILTER

Just like the application of the self-deconvoluted error filter, statistical computation of the prediction error filter $\alpha$ can be performed in different ways. In all cases, the non-predictable portion of the data is computed by means of a linear operator M: e=My where M can be expressed in different ways:

in frequency M(f) is defined by equation (8');
in time
non-recursive filtering:

$$m(i) = \overline{a(-i)} * \overline{g(-i)} * g(i) * a(i)$$

steady recursive filtering:

$$m(i) = \left[ \frac{\overline{a(-i)}}{\overline{c(i)}} \right] * \left[ \frac{a(-i)}{c(i)} \right]$$

non-steady recursive filtering: $M=A^*C^{*-1}C^{-1}A$
non-steady non-recursive filtering: $M=A^*G^*GA$

Non-Steady Recursive Filtering $\alpha$ can be computed, in accordance with the invention, by minimizing an error norm depending on $\alpha$ and on y; thus, it is possible for computing $\alpha$ to minimize the norm of the non-prediction portion e of seismic data:

$$\|e\|^2 = e^*e$$

e is obtained from the data by:

$$e = My$$

M being a linear operator expressed in a way that depends on the deconvolution method used. This operator depends on the prediction error filter. We have:

$$\|e\|^2 y^* M^* M y$$

It is nevertheless preferable to seek to minimize in a(0), . . . , a(p)

$$\beta_{min} = e^*e + \rho^*\rho = Y^*My \qquad (15')$$

which, taking account of the above, amounts to seeking to minimize $\|C^{-1}Ay\|^2$.

There follows a description of several ways of computing the prediction error filter by minimizing $\|C^{-1}Ay\|^2$ in accordance with the invention.

To compute the prediction error filter by minimizing $\|C^{-1}Ay\|^2$, a first way consists in writing $$d = C^{-1}Ay \qquad (16)$$

which can also be written $$d = C^{-1}Ya$$

where a is a vector whose components are a(0), . . . , a(p) and Y is the Toeplitz matrix formed on the basis of y having p+1 columns $y_0, \ldots, y_p$ where $$y_i = \begin{vmatrix} y(p-i) \\ \ldots \\ y(N-i) \end{vmatrix}$$

$i = 0, \ldots, p$

Minimizing $\|C^{-1}AY\|^2$ amounts to minimizing $d^*d$.
To do this, we compute the matrix $U=C^{-1}Y$, then $U^*U$, finally solving $$(U^*U)h = (1, 0, \ldots, 0)^*$$

ignoring the dependence of U in a.

After computing h, having components h(0), . . . , h(p), it is then necessary to compute a(i), normalizing h(i) in such a manner that a(0)=1, as follows $$a(i) = h(i)/h(0) \quad i=0, \ldots, p$$

In order to take the dependence of U in a into account, the above computations are then performed again with new values of a(i) until the desired convergence has been obtained.

The method described above for computing α in statistical manner can be summed up as follows (process No. 7):

1) Selecting p+1 initial coefficient a(i).
2) Computing a non-steady filter C from the pre-colorized self-correlation r(i), C being such that CC*) R, R being the Toeplitz matrix formed from r(i).
3) Using non-steady recursive filtering to compute the p+1 vectors $u_i$:

$$u_i = C^{-1} y_i$$

4) Computing the covariance matrix of the terms $u_i$:

$$COV_u(i,j) = u_i u_j$$

5) Solving $$\sum_{j=0}^{p} COV_u(i,j) h(j) = \delta(i)$$

i=0, ..., p with δ(1)=0, and δ(i)=0 for i=1, ..., p
6) Computing a(i)=h(i)/h(0) i=0, ..., p
7) Repeating step 2) until obtaining the desired convergence of the values a(i).
8) Stop.

In a variant, to compute the prediction error filter, it is possible to perform the non-steady non-recursive filtering by replacing steps 2) and 3) of process No. 7 by:

2) Computing the non-steady filter G from the pre-colorized self-correlation r(i), G being such that $G^*G \approx R^{-1}$, where R is the Toeplitz matrix formed from r(i).
3) Computing by non-steady non-recursive filtering the p+1 vectors $u_i$ such that $u_i = G y_i$.

In a variant, to compute the prediction error filter minimizing $\|C^{-1}Ay\|^2$, it is possible to perform so-called steady recursive filtering.

The preceding equation $d = C^{-1}Ay$ can be written symbolically in the time domain as follows $$d(n) = a(i) * u(n) \quad (17)$$

with $$u(n) = \left[ \frac{y(n)}{c(i)} \right] \quad (18)$$

After computing the damped prediction error filter c(i), u(n) is computed using equation (18), and then values a(i) are sought that minimize $\Sigma |d(n)|^2$.

Numerous ways are known to the person skilled in the art for finding the terms a(i) that minimize $\Sigma |d(n)|^2$.

If a "correlation" method is used, it is assumed that u(n) is known for n=0, ..., N and is zero for other values of n, and thus that d(n) is not zero for n=0, ..., N+p and is zero elsewhere. Thus, the following is minimized:

$$\sum_{n=0}^{N+p} |d(n)|^2$$

Preferably, a "covariance" method is used which has the advantage of taking side effects better into account. It is assumed that u(n) is known for n=0, ..., N and is unknown elsewhere, thus d(n) is known only for n=p, N, and the following is minimized $$\sum_{n=p}^{N} |d(n)|^2$$

The process of statistically computing the prediction error filter by steady recursive filtering can be summed up as follows (process No. 8):

1) Selecting an initial prediction error filter a having coefficients a(0), a(1), ..., a(p).
2) Computing the precolorized self-correlation $r(i) = a(i) * \overline{a(-i)} + \epsilon^2 b(i) * \overline{b(-i)}$
3) Computing a damped prediction error filter c(i) from r(i) using process No. 2.
4) Using recursive filtering to compute u(0), u(N) by means of $$u(n) = \left[ \frac{y(n)}{c(i)} \right]$$

5) Computing the covariance matrix $COV_u$ of u(n)

$$COV_u(i,j) = \sum_{n=\max(i,j)}^{n=N-\min(i,j)} \overline{u(n-i)} u(n-j)$$

for $i = 0, \ldots, p$
and $j = 0, \ldots, p$

6) Computing the vector h of components h(0), ..., h(p) satisfying $COV_u h = [1, 0, \ldots, 0)]$ (e.g. by the Cholesky method).
7) Computing a(i) by normalizing h(i):
   a(i)=h(i)/h(0)
8) Returning to step 2) until the desired convergence has been obtained of the values a(i).

In a variant, to compute the prediction error filter that minimizes $\|C^{-1}Ay\|^2$, it is possible to perform non-recursive filtering which includes the following steps (process No. 9):

1) Selecting an initial prediction error filter α of coefficients a(0)=1, a(1), ..., a(p).
2) Computing the precolorized self-correlation $r(i) = a(i) * \overline{a(-i)} + \epsilon^2 b(i) * \overline{b(-i)}$
3) Computing g(i) from r(i) using process No. 1 (step 2).
4) Computing u(n)=g(i)*y(n).
5) Computing the covariance matrix $COV_u$ of u(n)

$$COV_u(i,j) = \sum_{n=\max(i,j)}^{n=N-\min(i,j)} u^*(n-i) u(n-j)$$

with $i = 0, \ldots, p$
and $j = 0, \ldots, p$

6) Computing h(0), ..., h(p) satisfying $$COV_u h = [1, 0, \ldots, 0]^* (\text{e.g. by the Cholesky method}).$$

7) Computing a(i) by normalizing h(i)

$$a(i) = h(i)/h(0)$$

8) Returning to step 2) until the desired convergence has been obtained of the values a(i).

In a third variant, to compute the prediction error filter minimizing $\|C^{-1}AY\|^2$, the following steps are used (process No. 10):

1) Selecting an initial prediction error filter α of coefficients a(0)=1, a(1), ..., a(p).
2) Computing A(f) by a Fourier transform of a(i).
3) Computing $UU(f) = |Y(f)|^2 / [|A(f)|^2 + \epsilon^2 |B(f)|^2]$.
4) Computing uu(i) by an inverse Fourier transform of UU(f).

5) Computing a(i) by solving the Toeplitz system of equations formed with uu(i) by the Levinson algorithm without a second member, for example.
6) Returning to step 2) until the desired convergence has been obtained of the values a(i).

Statistical Computation of the Pre-Colorization Filter

Without going beyond the ambit of the invention, it is possible to use function minimization techniques known to the person skilled in the art for minimizing a given norm as a function of coefficients b(0), . . . , b(q) of the precolorization filter b, with or without fixing the value $\epsilon$. In particular, in iterative computation, it is possible to estimate $\epsilon$ and/or b as a function of estimated noise statistics e and as a function of the innovation vector $\rho$ at the preceding iteration. The expression for the innovation vector $\rho$, i.e. $\rho = \epsilon B^* R^{-1} Ay$ shows that it can be computed as a by-product of computing e.

EXAMPLES OF APPLYING A METHOD OF THE INVENTION IN THE f-x PLANE

When recursive filtering is used, the invention makes it possible to perform deterministic filtering in the f-x plane, regardless of the form of the signal $y_0$ to be isolated in the f-k plane, without the selectivity of the filter giving rise to long computation time, and when the non-steady recursive filtering described above is used, the invention also makes it possible to avoid the drawbacks due to the side effects that are encountered in prior art methods.

A preferred implementation of the method of the invention is the following when the signal is defined by its localization in the f-k plane (deterministic filtering):
1) The user determines a zone in the f-k plane containing the signal $y_0$ to be isolated.
2) For all values of the space variable x, the data y(t,x) of the time variable t is subjected to the Fourier transform to obtain transformed data Y(f,x) in the f-x plane.
3) For each frequency f in the f-x plane:
   3a) take $$y(n) = Y(f, n);$$

3b) determine the ranges of the variable k that contain the predictable signal $y_0$ that is to be isolated, by making a section of said zone at constant f;
   3c) compute the elementary space prediction error filter (variable x) corresponding to each of the above ranges in k for given $\epsilon$ (e.g. using the abovedescribed Chebyshev polynomial method);
   3d) compute the overall prediction error filter a(i) and the corresponding precolorized self-correlation r(i):
   3e) compute the non-steady prediction error filter ep(j,i) from the precolorized self-correlation r(i) (preferably using process No. 5);
   3f) compute the non-predictable portion e(n) of the data by steps 3), 4), 5), and 6) of the non-steady recursive filtering process (process No. 6);
   3 g) subtract the non-predictable portion e(n) from the data y(n) to obtain the predictable portion $y_0(n)$; and
   3h) return to step 3a) for the following frequency f unless the last frequency in the f-x plane has been reached; and finally
4) For all x, perform the inverse Fourier transform for the variable f in e(n) or $y_0(n)$ to return to the t-x plane.

By applying the invention to seismic data y(f,x) in the f-x plane and when the prediction error filter a is computed in statistical manner, it is possible to mitigate the drawbacks of predictive filtering as encountered in the prior art, and in particular as proposed by Canales.

When performing statistical filtering, a preferred implementation of the method of the invention is as follows:
1) For all x, applying the Fourier transform to seismic data y(t,x) for the variable t to move to the f-x plane.
2) For each frequency f in the f-x plane:
   2a) take y(n)=Y(f,n);
   2b) choosing a length p for the prediction error filter, a factor $\epsilon$, and a precolorization filter b(0), . . . , b(q), and also a number of iterations for obtaining convergence in a(i);
   2c) computing:

$$u(n) = \left[ \frac{y(n)}{c(i)} \right]$$

by up recursive filtering, where c(i) is the damped prediction error filter of the preceding iteration (or that of the last iteration of the preceding frequency if performing the first iteration of the frequency currently being integrated);
   2d) computing the covariance matrix of u(n) (step 5) of process No. 8); in a variant computing the correlation matrix of u(n);
   2e) solving the system to obtain the coefficients a(i) of the prediction error filter, preferably steps 6) and 7) of process No. 8;
   2f) computing the precolorized auto-correlation r(i) (step 1 of process No. 6) and the damped prediction error filter c(i) (preferably by process No. 2);
   2g) returning to 2c) until the desired convergence has been obtained in the values of a(i);
   2h) using process No. 6 to obtain the non-predictable portion e(n) of the data;
   2i) subtracting the non-predictable portion e(n) from the data y(n) to obtain the predictable portion $y_0(n)$; and
   2j) returning to 2a unless at the last frequency.
3) For all x perform the inverse Fourier transform on $y_0(n)$ for the variable t to obtain $y_0(t,x)$.

The prediction error filter is advantageously computed in a steady recursive manner, with the self-deconvoluted prediction error filter being applied in non-steady recursive manner.

Figure 4:
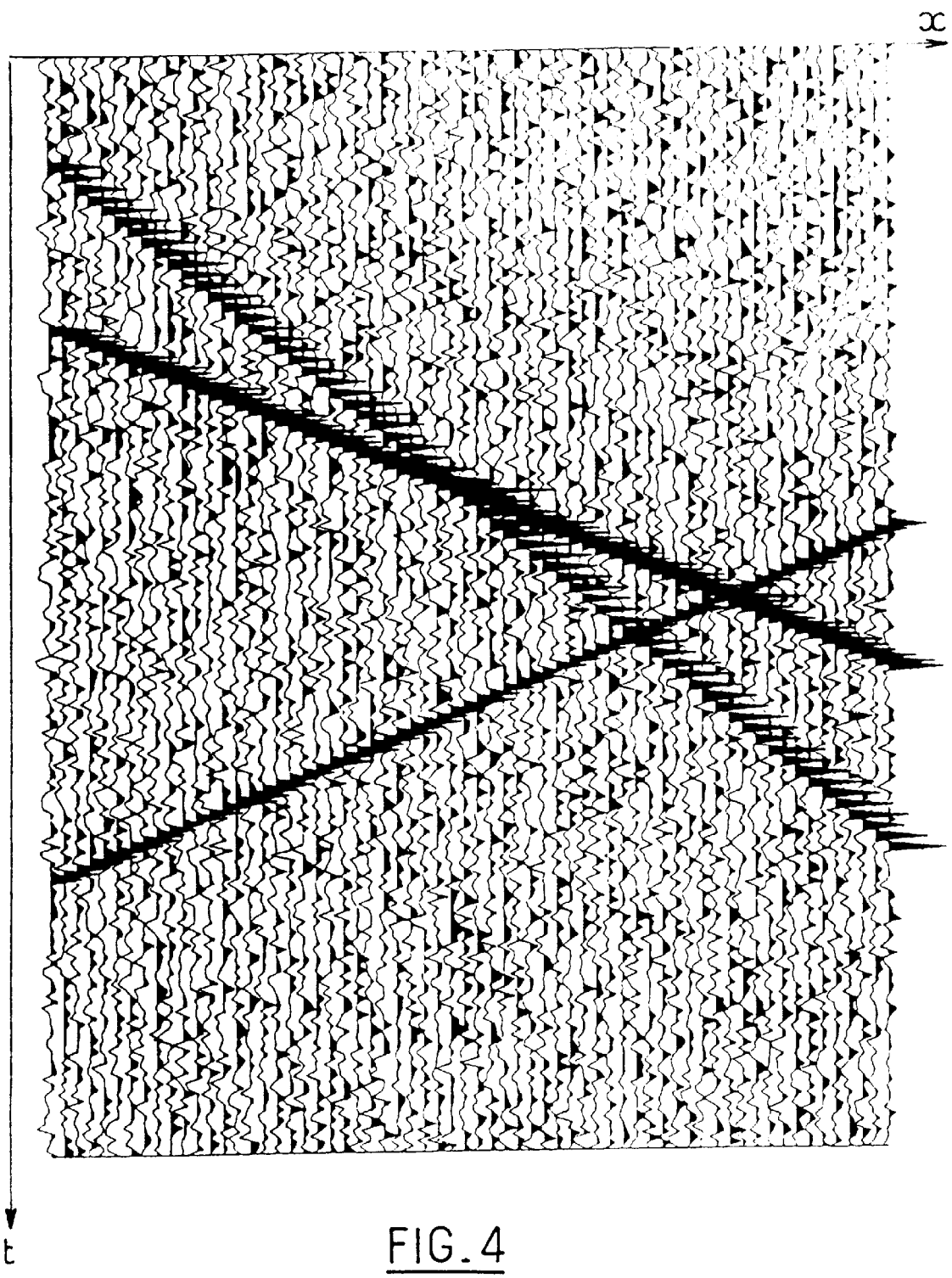
FIG. 4 shows a synthetic seismic section.

FIG. 4 shows a synthetic seismic section t-x where the time axis is vertical and the x axis is horizontal. The seismic data y(t,x) contains three predictable events (represented by straight lines) that it is desired to isolate from non-predictable random noise.

Figure 5:
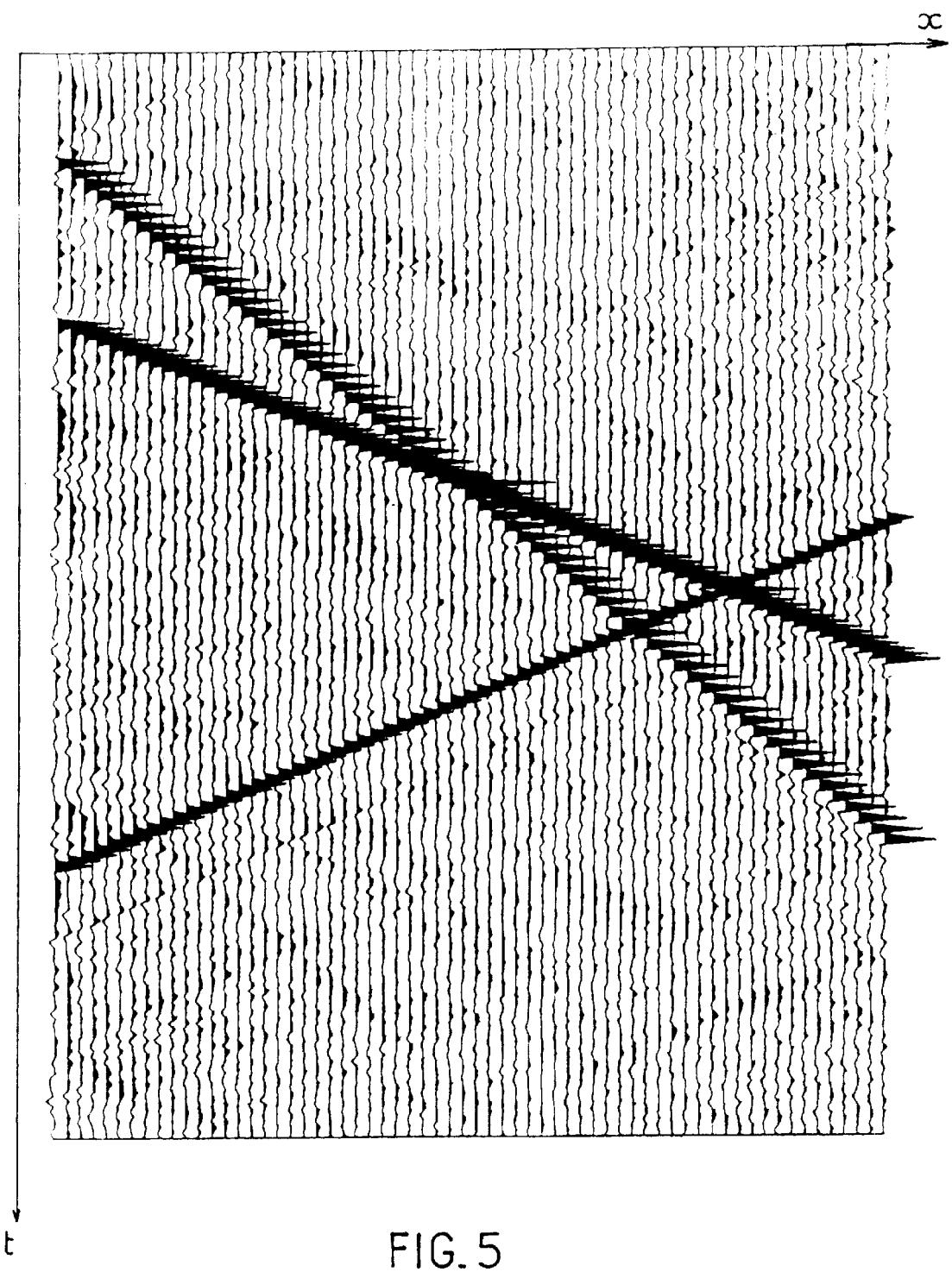
FIG. 5 shows the predictable portion $y_0(t,x)$ of the seismic data y(t,x) shown in the seismic section of FIG. 4, and as obtained by implementing the method of the invention.

FIG. 5 shows the predictable portion $y_0(t,x)$ after implementing the method of the invention. It will be observed that the random noise is strongly attenuated.

Figure 6:
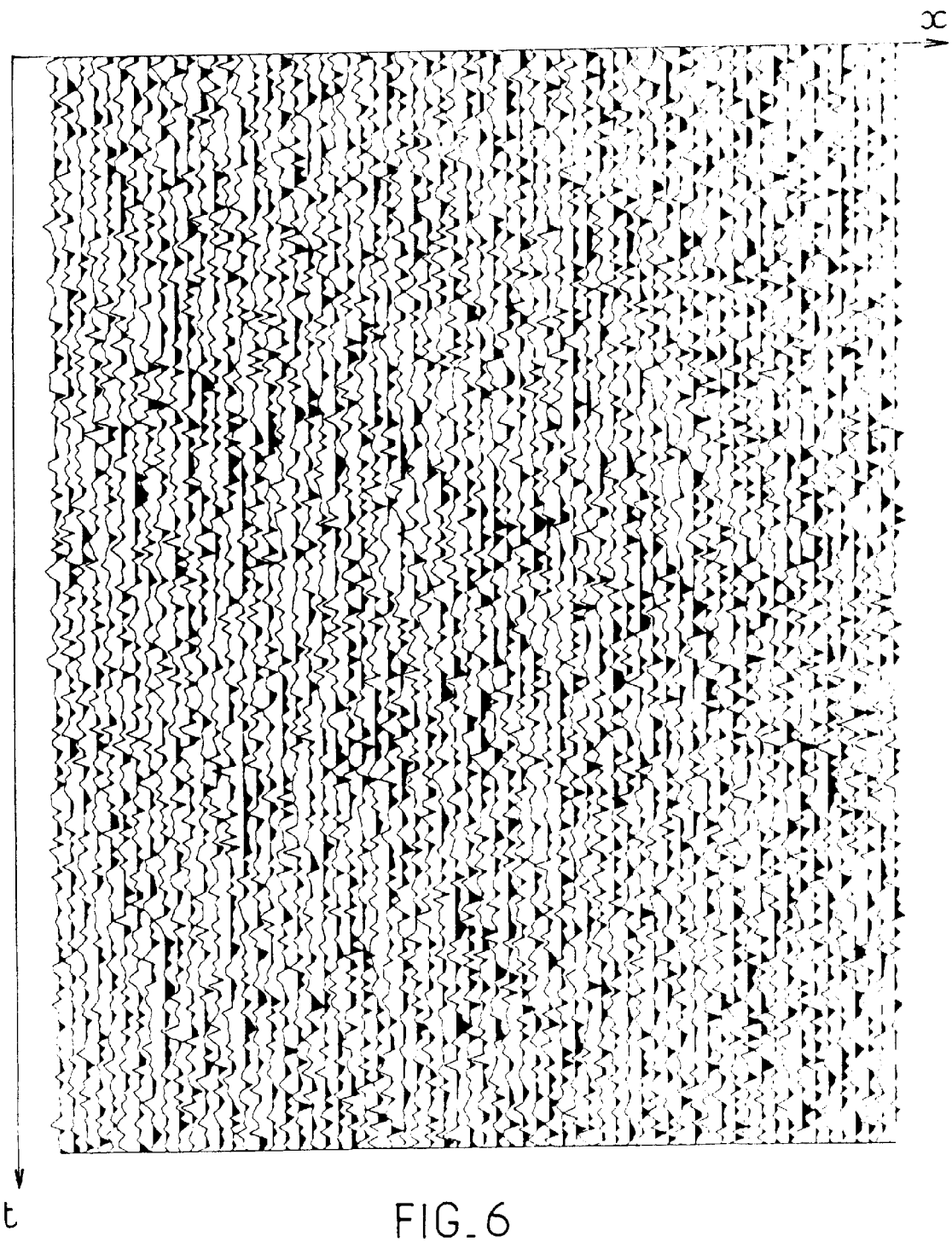
FIG. 6 shows the non-predictable portion e(t,x) of the seismic data y(t,x) shown in the seismic section of FIG. 4, and as obtained by implementing the method of the invention.

FIG. 6 shows the non-predictable portion e(t,x) and it may be observed that there is no predictable signal present, even at the edges (no edge effects).

Figure 7:
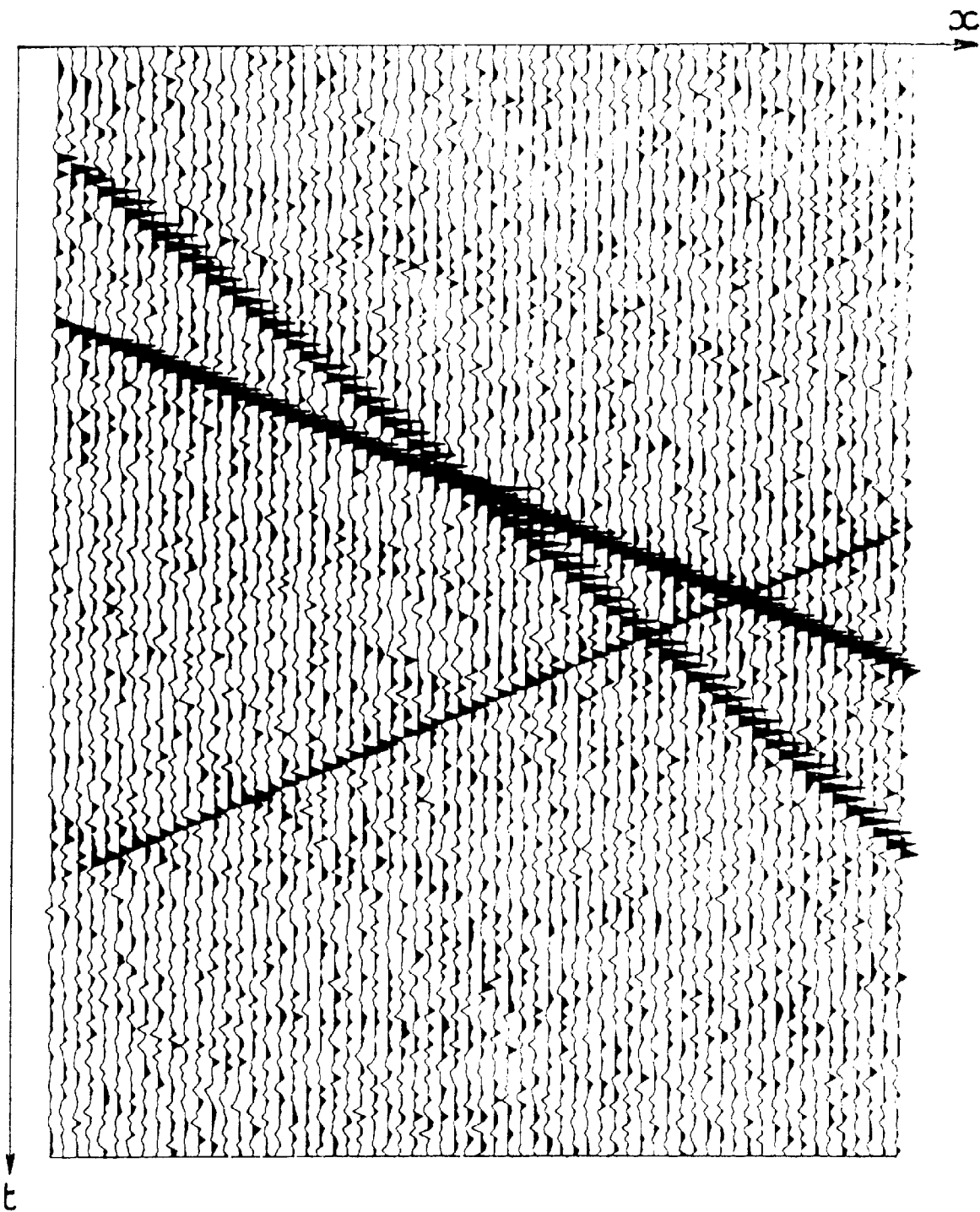
FIG. 7 shows the predictable portion of the seismic data y(t,x) shown in the seismic section of FIG. 4 as obtained by implementing a prior art method.
Figure 8:
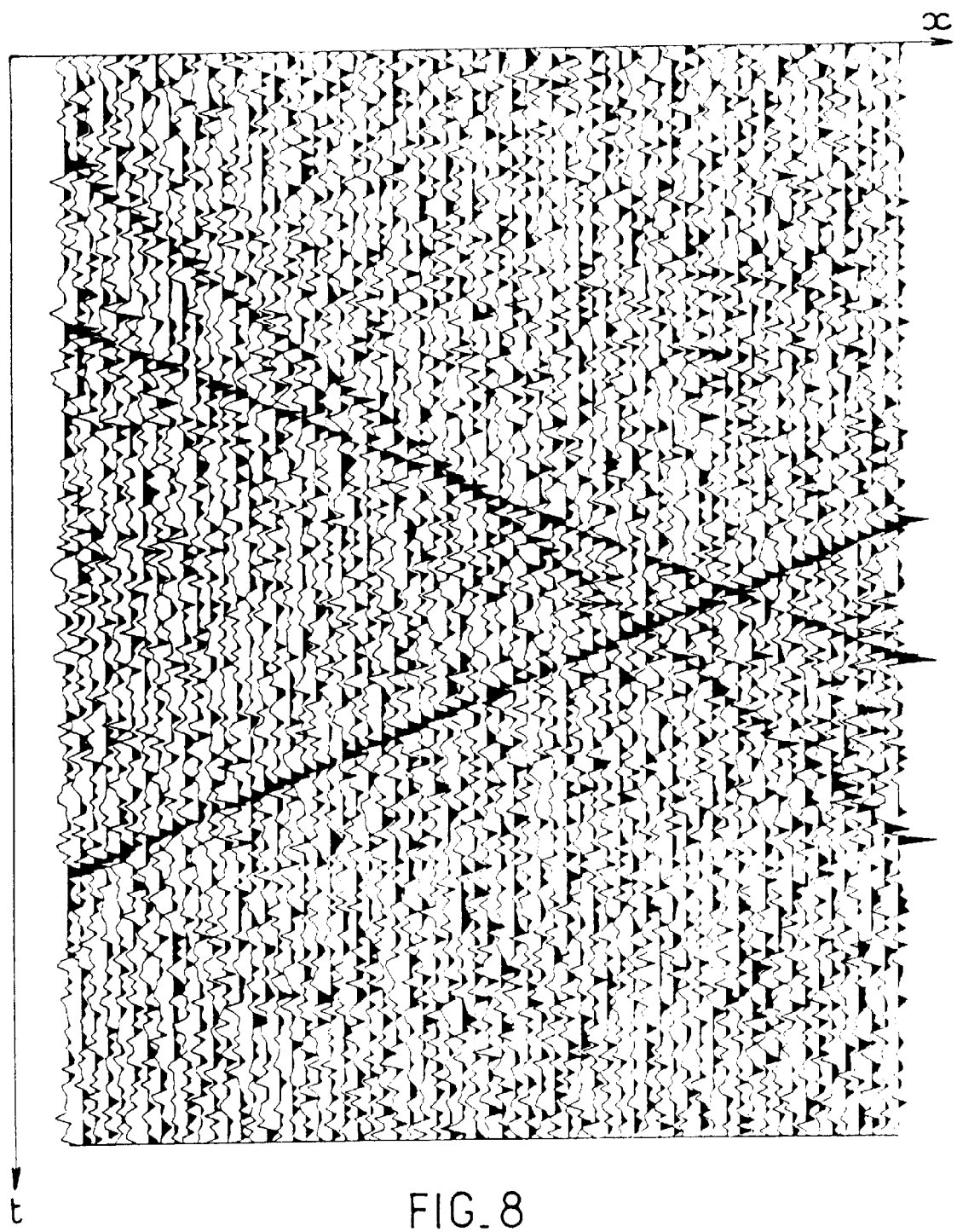
FIG. 8 shows the non-predictable portion of the seismic data y(t,x) shown in the seismic section of FIG. 4, as obtained by implementing a prior art method.

FIGS. 7 and 8 respectively show the predictable and the non-predictable portions as obtained when implementing the method described by Canales, improved by taking a bilateral prediction filter error a(−p), a(0)=1, . . . , a(p), and assuming that the non-predictable portion is obtained by applying said bilateral prediction error filter to the data.

In FIG. 7, it can be seen that noise attenuation is less good and in FIG. 8 that there can be a residue of the predictable signal.

Thus, when applied to attenuating random noise, the invention provides better noise attenuation and better signal preservation than is possible in the state of the art.

The invention is naturally not limited to the examples described above.

For example, it is possible to impose a particular shape to the prediction error filter $\alpha$, by selecting the $p_{min}$ initial coefficients of the prediction error filter to be zero. The prediction error filter then has the form $[1, 0, \ldots, 0, a(p_{min}+1), \ldots, a(p)]$. Account must naturally be taken of this special form of prediction error filter when solving the system of equations formed from the covariance matrix $COV_u$ in the statistical process of computing the prediction error filter. The special form of the filter may advantageously be used for modelling predictable noise due to multiple reflections, in order to eliminate it.

The above-described methods of the invention can be implemented in the time domain or in the space domain, and they are easily generalized to a plurality of dimensions. One-dimensional equations can easily be converted into two-dimensional equations, etc., using appropriate notation.

Thus, for example, the predictability of $y_0(n_{x1}, n_{x2})$ of medium $n_{x1}=0, \ldots, N_{x1}, n_{x2}=0, \ldots, N_{x2}$ by the prediction error filter $a(i,j)$ of medium $i=0, \ldots, p_{X1}, j=0, \ldots, p_{x2}$ can be written:

$$a(i,j)**y_0(n_{x1},n_{x2})=0 \qquad (19)$$

where ** symbolizes a convolution product having two dimensions.

Let $Y_{0nx1}$ be the vector of components such that $Y_{0nx1}(n_{x2})=Y_0(n_{x1}, n_{x2})$ and let $A_i$ be the matrix of components $A_i(n,j)=a(i,n-j)$.

Equation (19) is written:

$$\sum_{i=0}^{p} A_i Y_{0nx1-i} = 0$$

i.e. $A_i(*)Y_{0nx1}=0$ where (*) is a symbolic notation for the matrix convolution product.

With this notation, the one-dimensional equation $$r(i)=a(i)* a(-i)+\epsilon^2 b(i)* b(-i)$$

is written:

$$R_n = A_n A^*_n + \epsilon^2 B_n B^*_n$$

where for all n, $R_n$ is a Toeplitz matrix in blocks.

With non-recursive filtering, the matrix of the system to be solved in order to find the matrices $G_n$ has the structure of a Toeplitz matrix in blocks, so the system can be solved by a Levinson algorithm using blocks. As a subsidiary point, each of the blocks is itself a Toeplitz matrix.

With recursive filtering, the matrices $C_n$ or $EP_{ji}$ are computed from $R_n$ by analogy with above-described recursive filtering processes Nos. 2 and 5. In the deterministic case, the least squares method is easily generalized to a plurality of dimensions.

The invention may also apply to the $f-k_{x1}-x_1$ domain in the presence of three-dimensional data that is a function of variables $t$, $x_1$ and $x_2$. In the $f-x_1-x_2$ domain, it is advantageous to use a two-dimensional prediction error filter as described above, and in the $f-k_{x2}-x_1$ domain each $k_{x2}$ is subjected to processing analogous to that of the seismic data in the f-x plane, as described above.

The invention also applies to performing so-called "multichannel" processing for which m collections of data $y_j$ are available:

$$y_j=[y_j(0), \ldots, y_j(N)] j=1, \ldots, m$$

comprising a predictable portion $y_{0j}$ for a common prediction error filter.

Then $y_j(n)=y_{0j}(n)+e_j(n)$ and $a(i)*y_{0j}(n)=0$

Multichannel statistical computation of the prediction error filter is performed in accordance with the invention by minimizing:

$$\sum_{j=1}^{m} y_j^* M y_j$$

by computing covariance matrices $COV_j$ corresponding to each data collection $y_j$, calculating $\Sigma_j COV_j = COV$ and by solving the system with COV. In process No. 8, that corresponds to steps 4) and 5) which must be performed for all j, step 6) being performed with the COV matrix.

The invention is advantageously applied to restoring missing data.

In practice, it often happens that in a seismic section t-x the trace corresponding to a sensor placed at abscissa x on the acquisition grid is unusable either because of a fault in the data acquisition installation or because the signal delivered by the sensor was saturated during recording by a very high level of noise.

The invention makes it possible to restore the predictable component of the missing data.

The seismic data is then assumed to contain a predictable signal for a prediction error filter having coefficients $a(i)$, impulse noise for the missing values, and a non-predictable additive signal.

The data is written in the form:

$$y = z - \sum_{j=1}^{m} w(j) p_j$$

where z designates the vector containing the existing and known seismic data, and pj designates the vector containing the impulse response of the jth impulse noise corresponding to the jth missing value of index I(j).

The vector $p_j$ has components $p_j(0), \ldots, p_j(N)$ such that:

$$p_j(n)=1 \text{ if } n=I(j) \text{ and } p_j(n)=0 \text{ if } n \neq I(j)$$

w(j) is a scalar designating the unknown amplitude of the jth impulse noise.

The data missing in the vector z can be taken to be arbitrary, for example equal to 0.

In which case, $$z(I(i))=0 \text{ and } w(j)=-y(I(j))$$

The value reconstituted for location I(j) is thus $-w(j)$.

Let P be the matrix whose columns are the vectors $p_j$.

Let w be the vector whose components are the scalars w(j).

Then:

$$y=z-Pw$$

It is necessary to subject the reconstituted y to separation into predictable portion $y_0$ and non-predictable portion e.

$$y=y_0+e$$

Thus:

$$z=y_0+e+Pw$$

e is computed from y using a linear operator M, whose expression varies as a function of the deconvolution method used, but which, in all cases, is put in the form:

$M=H^* H$ and $e=My$

By way of example, in the non-steady, recursive case: $H=C^{-1}A$.

The vector w is determined by minimizing:

$$\beta_{min+\lambda}{}^2 W^* w = y^* M y + \lambda^2 w^* w$$

from equation (15'), $\lambda$ being a prebleaching factor.

Attempts are made to minimize the quantity $$(z-Pw)^* M(z-Pw)+\lambda^2 w^* w \qquad (20)$$

w is found by minimizing (20) by solving:

$$(P^* M P + \lambda^2 I) w = P^* M z,$$

where I is the identity matrix.

Writing D=HP and s=Hz, $$(D^* D + \lambda^2 I) w = D^* s$$

The expression for the reconstituted data y is deduced therefrom:

$$y = z - P(D^* D + \lambda^2 I)^{-1} D^* s$$

The expression for the non-predictable portion is:

$$e = H^* H[z - P(D^* D + \lambda^2 I)^{-1} D^* s]$$

or indeed $$e = H^* [s - D(D^* D + \lambda^2 I)^{-1} D^* s]$$

and the predictable portion $y_0$ is computed by:

$$y_0 = y - e$$

$$y_0 = z - P(D^* D + \lambda^2 I))^{-1} D^* s - H^* [s - D(D^* D + \lambda^2 I))^{-1} D^* s]$$

If the input is z and the reconstituted data output y, then the invention serves to restore missing data.

If the input is z and the output is the predictable portion $y_0$, then the invention makes it possible to restore missing data and to attenuate noise.

Naturally, without going beyond the ambit of the present invention, it is possible to generalize to the case where the $p_j$ terms are constituted by any impulse response of noise of known form $p_j$ and unknown amplitude w(j).

If the prediction error filter $\alpha$ is unknown, there are two vectors w and a to be found.

We start from initial values for y(n) (e.g. with the missing values set to 0). a(i) is computed with constant y(n) using a statistical or a deterministic method for computing the prediction error filter. Then the above method of computing y from z can be used to update y(n) with constant a(i). Then the method returns to computing a(i) if statistical computation is being used.

For input data being the known values of y(n) and for each vector $p_j$ for j=1, ..., m being the impulse response of the jth noise, the method implemented comprises the following steps in the statistical case (process No. 11):

1) Initializing the data y(n).
2) Computing the prediction error filter a(i) for current y(n).
3) Updating y(n) for current a(i):

3a) Computing $\underline{m}$ vectors $d_j = H p_j$ j = 1, ..., m;
3b) Computing the vector $s = Hy$;
3c) computing the matrix $\chi(i,j) = d_i^* d_j$ i,j = 1, ..., m;
3d) adding the prebleaching factor:
$\chi(i,i) \leftarrow \chi(i,i) + \lambda^2$ i = 1, ..., m;
3e) computing the vector $k(i) = d_i^* s$;
3f) solving the linear system of order $\underline{m}$:

$$\sum_{j=1}^{m} r(i,j) w(j) = k(i) \quad i = 1, \ldots, m;$$

3g) updating y(n) as follows:

$$y \leftarrow y - \sum_{j=1}^{m} w(j) p_j$$

4) Returning to 2) until the desired convergence has been obtained for a(i) or else move on to 5).
5) Computing u:

$$u = s - \sum_{j=1}^{m} w(j) d_j$$

6) Computing $e-H^* u$.
7) Computing $y_0 = y - e$.

The above method of the invention is advantageously applied in the following cases:

Coherent noise

By using for columns of P the components of coherent noise of unknown amplitude, it is possible to model the presence of coherent noise in seismic data. For example, in the f-x plane, noise of known dispersion relationship $k_i(f)$:

$$p_i(n) = e^{jn\Delta x k i(f)} \text{ with } n=0, \ldots, N$$

Missing traces

FIG. 9 shows a t-x seismic section in which ten traces are missing.

In general, assume that there are m missing traces of indices I(1).. .I(m) in the seismic section.

The matrix P is built up having m columns with the jth column being the vector $p_j$ of components $p_j(0), \ldots, p_j(N)$ such that:

$$p_j(n)=1 \text{ if } n=I(j), \text{ and } p_j(n)=0 \text{ if } n \neq I(j)$$

This models the existence of impulse noise for the given values, which amounts to saying they are unknown.

Advantageously, computation time is reduced by computing only one vector $d=Hp_0$ where $p_0(p)=1$ and $p_0(n)=0$ if $n \neq p$.

In this case $Ap_0 = [a(0), \ldots, a(p), 0, \ldots, 0]^T$.

If steady recursive filtering is used for applying H, then:

$$d(i) = \left[ \frac{a(i)}{c(i)} \right]$$

This is increasing-power division of two polynomials which can be stopped as soon as the values of d(i) become negligible.

The vector $d_j$ is obtained by shifting the vector d through I(j)−p samples downwards and setting the initial I(j)−p samples to zero.

$$d_j(n) = 0 \qquad \text{for } n < I(j) - p$$
$$d_j(n) = d(n - I(j) + p) \quad \text{for } n \geq I(j) - p$$

In the non-steady recursive case, the operations of the form s=Hy are performed by steps 3) and 4) of process No. 6, and the operations of the form $e=H^* u$ are performed by steps 5) and 6) of the same process.

A simplified variant consists in replacing step 3) of updating from y(n) to constant a(i) by an iterative process that does not require a linear system to be solved. Step 3') replacing step 3) is as follows:

3') Updating y(n) for current a(i):

3a) initializing $y_{it}(n)=y(n)$ 3b) computing the non-predictable portion e(n) of $y_{it}(n)$ 3c) updating $y_{it}(n)$ for only those n samples that correspond to the missing values (n=I(j) for j=1, . . . m) as follows:

$$y_{it}(n) \leftarrow (1-\lambda^2)y_{it}(n)+\lambda^2 y(n)-e(n)$$

3d) returning to 3b), or moving on to 3e) if the desired convergence is obtained in $y_{it}(n)$ 3e) updating y(n) only for the samples n that correspond to the missing values as follows:

$$y(n)=y_{it}(n).$$

FIG. 10 shows the data y are restored in application of the invention, and FIGS. 11 and 12 show the predictable and non-predictable portions respectively of the restored data. Comparing FIGS. 11 and 5 shows that the ten missing traces degrade the final result by very little.

Portions of missing traces

This applies when, in the t-x seismic section, there are missing values for certain known pairs t,x (e.g. for certain traces, the values y(t) corresponding to certain time intervals are missing).

In this case, each frequency is not processed independently.

In the t-x seismic section:

$$y=z-Pw$$

where y in this case is the set of values in t and x of a seismic section, z contains the set of known values, w the set of unknown data, and P is a linear operator which positions the unknown data in the set of values in t and x of the seismic section.

Advantageously, the conjugate gradient algorithm is used to solve the system:

$$(D^*D+\lambda^2 I)w=D^*s \quad (21)$$

For this purpose, the linear operator D is written in the form:

$$D=HFP \quad (22)$$

where F represents the linear operator that transforms the t-x plane into the f-x plane by applying the Fourier transform of the variable t in F for each x.

To apply the conjugate gradient algorithm to the linear system (21) there is no need to write the matrix D, it suffices to know how to perform the following operations:

$$u'=Dv' \text{ and } r'=D^*u'$$

From expression (22) the method of performing u'=Dv' consists in:

1) take the values of v' (v' is an arbitrary vector having the same dimension as the missing values) and place them on the t-x section with zero values for the known values (operator P');
2) perform the Fourier transform of t to f for all x (apply the operator F);
3) apply the operator H for all f.

The method for performing r'=D* u' consists in:

4) apply the operator H* for all f over u' (u' being a section in the f-x plane);
5) perform the inverse Fourier transform of f to t for all x (without normalizing the values by dividing them by the number of samples) (operator F* ); and
6) take from the resulting t-x seismic section the values that appear at the missing locations (operator p* ).

Also:

$$s=CFz$$

s can therefore be computed by applying above steps 2) and 3) to the known data, y−D* s being computed by means of steps 4), 5), and 6).

Using g and the method of performing steps 1) to 6) in cascade, the conjugate gradient algorithm solves the system (21).

Once w has been computed, the reconstituted t-x seismic section is obtained by:

$$y=z-Pw$$

Thereafter, y can be separated into a predictable portion and a non-predictable portion in the f-x plane to attenuate noise.

When the prediction error filter is unknown, it is also possible to integrate this method is process No. 11 as a replacement for step 3) for computing y(n) in said process.

It is also possible to convert step 3' for the case where portions of traces are missing. The following flow chart is thus obtained (process No. 12):

1) Initializing data y(t,n).
2) Using the Fourier transform to go from y(t,n) to Y(f,n).
3) Updating a(f,i):
    3a) for all f:
        i) y(n)=Y(f,n)
        ii) statistically computing the prediction error filter a(f,i) for y(n) and i=0, . . . , p
        iii) initializing $Y_{it}(f,n)=Y(f,n)$ for all n
        iv) returning to 3a)i), or if last frequency, moving on to 4).
4) Updating y(t,n):
    4a) initializing $y_{it}(t,n)=y(t,n)$
    4b) using the Fourier transform to go from $y_{it}(t,n)$ to $Y_{it}(f,n)$
    4c) for all f:
        i) $y_{it}(n)=Y_{it}(f,n)$
        ii) computing the non-predictable portion e(n) of $y_{it}(n)$ by means of the operator M(f) computed from a(f,i) already computed in 3c)
        iii) E(f,n)=e(n)
        iv) returning to i) or moving on to 4d) if last frequency.
    4d) using the inverse Fourier transform to go from E(f,n) to e(t,n)
    4e) updating $y_{it}(t,n)$ for only those samples (t,n) that correspond to the missing values as follows:

$$y_{it}(t,n)=(1-\lambda^2)y_{it}(t,n)+\lambda^2 y(t,n)-e(t,n)$$

4f) returning to 4b) or moving on to 4g) if $y_{it}(t,n)$ has converged as desired
    4g) updating y(t,n) as follows:

$$y(t,n)=y_{it}(t,n).$$

5) Returning to 2) or continuing to 6) if a(f,i) has converged.

6) Obtaining reconstituted data y(t,n) that can be separated into $y_0(t,n)$ and e(t,n) in the (f-x) domain.

Interpolation

A given t-x seismic section can be replaced by a section whose grid in space has a smaller step size, and the missing traces can be computed by implementing the method of the invention.

It is assumed below that only one out of every m traces is known.

Advantageously, the following method is applied:

Let A(f) be the prediction error filter for the interpolated data computed deterministically or by some other method.

Let Z(f) be the data spectrum obtained from the known data which is assumed to be regularly spaced, by setting to zero all of the missing data situated in a grid that is m times finer than the known data grid, where m is the interpolation factor. Let Y(f) be the interpolated data from which noise has not been removed and that is to be estimated initially.

Z(f) can be written as follows:

$$Z(f)=Y(f)+Y(f+1/m)+Y(f+2/m)+ \ldots +Y(f+(m-1)/m)$$

If Y(f) contains p frequency lines $f_j$ at which A(f) cancels, the signal Z(f) will contain frequencies $f_j+i/m$, i=0, ..., m−1.

The following prediction error filter is constructed $$A_z(f)=A(f+1/m)A(f+2/m) \ldots A(f+(m-1)/m)$$

enabling the frequencies $f_j+i/m$ for i=1, ..., m−1 to be removed and recovering Y(f).

In the time domain, $a_z(i)$ is computed by convolution of the m prediction error filters obtained from a(i) by modulation. A(f+k/m), k=1, ..., m−1 is of length p in the time domain and is written as follows:

$$[a(0), a(1)e^{2j\pi \cdot k/m}, a(2)e^{2j\pi \cdot 2k/m}, \ldots a(p)e^{2j\pi \cdot pk/m}]$$

Also, the self-correlation of each modulated prediction error filter is computed, a prebleaching factor is added to each of them, and convolution is performed.

This obtains the precolorized self-correlation $r_z(i)$.

The interpolated data still containing noise Y(f) can thus be estimated by applying to Z(f) the error filter M(f) computed from the prediction error filter $A_z(f)$. In the frequency case, this is written as follows:

$$Y(f) = \frac{|A_z(f)|^2}{R_z(f)} Z(f)$$

but it is also capable of being computed in the time domain by one of the above-described time filtering structures.

Using the interpolated data containing noise Y(f), it is possible to compute the interpolated signal from which noise has been removed $Y_0(f)$ using the prediction error filter A(f), its precolorized self-correlation, and one of the above-described methods. In the frequency case, this is written as follows:

$$Y_0(f) = Y(f) - \frac{|A(f)|^2}{R(f)} Y(f)$$

Another possibility that is faster is to put Y(f)=Z(f) and remove noise afterwards, which is equivalent to writing:

$$Y_0(f) = Z(f) - \frac{|A(f)|^2}{R(f)} Z(f)$$

This method can give good results if the filter $$I - \frac{|A(f)|^2}{R(f)}$$

has a broad attenuation zone.

I claim:

1. A seismic prospection method in which:

a seismic disturbance is caused to take place in the sub-soil;

sensors are used to receive sampled seismic data $y=[y(0), \ldots, y(N)]^T$ where N is an integer, said data containing a signal $y_0$ that is to be isolated and that is embedded in additive noise;

the seismic data is subjected to filtering in the time domain or the frequency domain to obtain filtered data in which the signal to be isolated is absent;

the filter data is subtracted from the initial seismic data to obtain processed data $y_0(0), \ldots, y_0(N)$ corresponding to the signal $y_0$ without additive noise;

the filter used for filtering the seismic data being at least one of a frequency or a time domain filter corresponding to a self-deconvoluted prediction error frequency filter M(f) such that:

$$M(f)=|A(f)|^2/R(f)$$

A(f) being the spectrum of a prediction error filter a having p+1 coefficients a(0), ..., a(p) where p is an integer smaller than N, α being previously selected for best canceling by convolution of the signal $y_0$ that is to be isolated, R(f) being a precolorized self-correlation of said prediction filter α satisfying:

$$R(f)=|A(f)|^2+\epsilon^2|B(f)|^2$$

where $\epsilon$ and B(f) are respectively a precolorization factor and a precolorization filter previously selected as a function of the selectivity desired for the filtering.

2. A method according to claim 1, characterized in that the p+1 coefficients a(0), a(1), ..., a(p) of the prediction error filter α are computed deterministically from known physical parameters of the signal $y_0$ that is to be isolated.

3. A method according to claim 2, in which the signal $y_0$ has a spectrum $Y_0(f)$ constituted by p frequency lines $f_q$ (q=1, ..., p), characterized in that the coefficients a(0), a(1), ..., a(p) of the prediction error filter α are computed by:

$$a(i)=a_1(i)*a_2(i)* \ldots *a_p(i)$$

$$a(0)=1$$

with $$a_q(0)=1$$

$$a_q(1)=-e^{-2j\pi f_q}$$

4. A method according to claim 2, in which the signal $y_0$ has a spectrum $Y_0(f)$ whose medium includes at least one frequency range $$[f_q-\Delta f_q, f_q+\Delta f_q]$$

where $\Delta f_q$ is the half-width of the range centered on the frequency $f_q$, characterized in that the coefficients a(0), a(1), ..., a(p) of the prediction error filter α of spectrum A(f) are determined by a least squares method by minimizing the integral $\int_0 W(f) |A(f)|^2 df$ with a(0)=1 and W(f) being a function equal to 1 when f lies in a range of frequencies where the spectrum $Y_0(f)$ is not zero, and 0 elsewhere.

5. A method according to claim 2, in which the signal $y_0$ has a spectrum $Y_0(f)$ whose medium includes Q frequency ranges $$[f_q - \Delta f_q, f_q + \Delta f_q] \; q=1, \ldots, Q$$

$\Delta f_q$ being the half-width of a range centered on the frequency $f_q$, characterized in that the coefficients of the prediction error α are determined by $$a(i) = a_1(i) * a_2(i) * \ldots * a_Q(i)$$

with $$a_q(i) = s_q(i)/s_q(0) \text{ for } q=1, \ldots, Q$$

the coefficient $s_q(i)$, i=0, ..., $P_q$ being determined by the relationship $$S_q(f) = e^{-j\pi f p} T_{pq}[\sin(\pi(f-f_q))/\sin(\pi \Delta f_q)]$$
$$= \Sigma s_q(m) e^{-j2\pi m f}$$

where $T_{pq}$ is the Chebyshev polygonal of the first kind and of order $p_q$ and in that the precolorized self-correlation is computed by:

$$r(i) = r_1(i) * r_2(i) * \ldots * r_Q(i)$$

with $$r_q(-i) = a_q(i) * \overline{a_q(i)} + \epsilon^2 \delta(i)$$

and $$\Delta_q \gg 1/s_q(0).$$

6. A method according to claim 1, characterized in that the filtering consists, in the frequency domain, in multiplying the seismic data y(0), ..., y(N) by the filter M(f).

7. A method according to claim 1, characterized in that when filtering in the time domain, the precolorized self-correlation is computed of r(i) corresponding in the time domain to R(f) and such that:

$$r(i) = a(i) * \overline{a(-i)} + \epsilon^2 b(i) * \overline{b(-i)}$$

where b is the precolorization filter equivalent to B(f) in the time domain.

8. A method according to claim 7, characterized in that the filtering by the self-convoluted prediction error filter includes the following steps:
1) computing a filter g(i) such that $$r(i) * \overline{g(i)} * g(i) = \delta(i);$$

2) using non-recursive filtering to compute e(n) for n over the range 0 to N, as follows:

$$e(n) = \overline{a(-1)} * \overline{g(-i)} * g(i) * a(i) * y(n)$$

e(n) being additive noise.

9. A method according to claim 7, characterized in that the filtering by the self-convoluted prediction error filter includes the following steps:
1) computing the filter c(i) such that $c(i) * \overline{c(-i)} \approx \rho(i)$;
2) computing u(n) by up recursive filtering for n over the range 0 to N as follows:

$$u(n) = \left[ \frac{a(i)}{c(i)} \right] * y(n)$$

3) computing e(n) by down recursive filtering for n over the range 0 to N as follows:

$$e(n) = \left[ \frac{\overline{a(-i)}}{\overline{c(-i)}} \right] * u(n)$$

e(n) being additive noise.

10. A method according to claim 7, characterized in that applying the self-convoluted prediction error filter to data includes the following steps:
1) computing a non-steady filter G from the precolorized self-correlation r(i), where G is such that $G*G \approx R^{-1}$, R being the Toeplitz matrix formed from r(i);
2) using steady non-recursive filtering to compute s=Ay corresponding to s(n)=a(i)*y(n);
3) using non-steady non-recursive filtering to compute u=Gs;
4) using non-steady non-recursive filtering to compute v=G*u;
5) using steady non-recursive filtering to compute e=A*v corresponding to $e(n)=\overline{a(-i)}*v(n)$ e(n) being additive noise.

11. A method according to claim 7, characterized in that the application of the self-convoluted prediction error filter to seismic data includes the following steps:
1) computing the non-steady filter C from the precolorized self-correlation r(i), C being such that CC*=R, R being the Toeplitz matrix formed from r(i);
2) using steady non-recursive filtering to compute s=Ay corresponding to s(n)=a(i)*y(n);
3) using non-steady recursive filtering to compute $u=C^{-1}s$;
4) using non-steady recursive filtering to compute $v=C^{-1}*u$;
5) using steady non-recursive filtering to compute e=A*v corresponding to $e(n)=\overline{a(-i)}*v(n)$ e(n) being additive noise.

12. A method according to claim 7, characterized in that the p+1 coefficients a(0), a(1), ..., a(p) of the prediction error filter α are computed statistically by successive iterations, by minimizing a norm depending on α and seismic data y.

13. A method according to claim 12, characterized in that the p+1 coefficients a(0), a(1), ..., a(p) are computed by the following process:
1) computing Y(f) by a Fourier transform of the data y(n);
2) selecting an initial prediction error filter α of coefficients a(0)=1, a(1), ..., a(p);
3) computing A(f) by a Fourier transform of a(i);
4) computing $UU(f) = |Y(f)|^2/[|A(f)|^2 + \epsilon^2 |B(f)|^2]$;
5) computing uu(i) by an inverse Fourier transform of UU(f);
6) computing a(i) by solving the system of Toeplitz equations formed with uu(i);
7) returning to step 2) until reaching the desired convergence for the values a(i).

14. A method according to claim 12, characterized in that the p+1 coefficients a(0), a(1), ..., a(p) are computed by the following process:

1) selecting an initial prediction error filter $\alpha$ having coefficients $a(0)=1, a(1), \ldots, a(p)$;
2) computing the precolorized self-correlation $r(i)=a(i)*\overline{a(-i)}+\epsilon^2 b(i)*\overline{b(-i)}$;
3) computing $g(i)$ from $r(i)$, $g(i)$ being such that $r(i)*g(i)*\overline{g(-i)} \approx \delta(i)$ with $\delta(i)=1$ if $i=0$ and $\delta(i)=0$ otherwise;
4) computing $u(n)=g(i)*y(n)$;
5) computing the covariance matrix $COV_u$ of $u(n)$ $$COV_u(i,j) = \sum_{n=\max(i,j)}^{n=N-\min(i,j)} \overline{u(n-i)}u(n-j)$$

with $i = 0, \ldots, p$
and $j = 0, \ldots, p$ 6) computing $h(0), \ldots, h(p)$ satisfying $$COV_u h = [1, 0, \ldots, 0]^*;$$

7) computing $a(i)$ by normalizing $h(i)$: $a(i)=h(i)/h(0)$;
8) returning to step 2) until reaching the desired convergence of the values $a(i)$.

15. A method according to claim 12, characterized in that the $p+1$ coefficients $a(0), a(1), \ldots, a(p)$ are computed by the following processing:
1) selecting an initial prediction error filter a of coefficients $a(0), a(1), \ldots, a(p)$;
2) computing the precolorized self-correlation $r(i)=a(i)*\overline{a(-1)}+\epsilon^2 b(i)*\overline{b(-1)}$ where $b(i)$ is a pre-colorization filter;
3) computing the damped prediction error filter $c(i)$ from $r(i)$ by an iterative process of recursive time filtering;
4) computing $u(0), \ldots, u(N)$ by recursive filtering using:

$$u(n) = \left[ \frac{y(n)}{c(i)} \right]$$

5) computing the covariance matrix $COV_u$ of $u(n)$ $$COV_u(i,j) = \sum_{n=\max(i,j)}^{n=N-\min(i,j)} \overline{u(n-i)}u(n-j)$$

for $i = 0, \ldots, p$
and $j = 0, \ldots, p$ 6) computing the vector h of components $h(0), h(p)$ satisfying $COV_u h=[1, 0, \ldots, 0)]^*$;
7) computing $a(i)$ by normalizing $h(i)$:

$$a(i)=h(i)/h(0);$$

8) returning to step 2) until reaching the desired convergence for values $a(i)$.

16. A method according to claim 12, characterized in that $p+1$ coefficients $a(0), a(1), \ldots, a(p)$ are computed by the following process:
1) selecting $p+1$ initial coefficients $a(i)$;
2) computing the non-steady filter G from the pre-colorized self-correlation $r(i)$, G being such that $G^*G \approx R^{-1}$, R being the Toeplitz matrix formed from $r(i)$;
3) using non-steady non-recursive filtering to compute the $p+1$ vectors $u_i$: $u_i=Gy_i$;
4) computing the covariance matrix of $u_i$:

$$COV_u(i,j)=u_i*u_j;$$

5) solving:

$$\sum_{j=0}^{p} COV_u(i,j)h(j) = \delta(i)$$

$i=0, \ldots, p$, with $\delta(1)=0$, and $\delta(i)=0$ for $i=1, \ldots, p$
6) computing $a(i)=h(i)/h(0)$ for $i=0, \ldots, p$;
7) return to step 2) until desired convergence for values $a(i)$;
8) stop.

17. A method according to claim 12, characterized in that $p+1$ coefficients $a(0), a(1), \ldots, a(p)$ are computed by the following process:
1) selecting $p+1$ initial coefficients $a(i)$;
2) computing the non-steady filter C from the pre-colorized self-correlation $r(i)$, C being such that $CC^* \approx R$, R being the Toeplitz matrix formed from $r(i)$;
3) using non-steady recursive filtering to compute the $p+1$ vectors $u_i$ such that: $u_i=C^{-1}y_i$ with $y_i=[y(p-i), \ldots, y(N-i)]^T$ for $i=0$ to $p$;
4) computing the covariance matrix of $u_i$:

$$COV_u(i,j)=u_i*u_j;$$

5) solving:

$$\sum_{j=0}^{p} COV_u(i,j)h(j) = \delta(i)$$

$i=0, \ldots, p$, with $\delta(1)=0$, and $\delta(i)=0$ for $i=1, \ldots, p$:
6) computing $a(i)=h(i)/h(0)$ for $i=0, \ldots, p$;
7) return to step 2) until desired convergence for values $a(i)$;
8) stop.

18. A method according to claims 2, 5, 7, or 11 in combination, characterized in that it comprises the following steps:
1) the user determining a zone of the f-k plane that contains the signal $y_0$ to be isolated;
2) for every value of the space variable x, perform the Fourier transform of the data $y(t,x)$ of the time variable t to obtain transformed data $Y(f,x)$ in the f-x plane;
3) for each frequency f in the f-x plane:
3a) take $$y(n)=Y(f,n);$$

3b) determine the ranges for the variable k containing the predictable signal $y_0$ that is to be isolated, by making a section of said zone at constant f;
3c) compute the elementary space prediction error filter (variable x) corresponding to each of these ranges in k for given $\epsilon$;
3d) compute the overall prediction error filter $a(i)$ and the corresponding precolorized self-correlation $r(i)$;
3e) compute the non-steady prediction error filter $ep(j,i)$ from the precolorized self-correlation $r(i)$;
3f) compute the non-predictable portion $e(n)$ of the data by non-steady recursive filtering using the coefficients $ep(j,i)$;
3g) subtract the non-predictable portion $e(n)$ from the data $y(n)$ to obtain the predictable portion $y_0(n)$;
3h) return to step 3a) for the following frequency f unless the last frequency of the f-x plane has been reached;
4) for all x, perform the inverse Fourier transform of the variable f of $e(n)$ or of $y_0(n)$ to return to the t-x plane.

19. A method according to claims 2, 7, 11, 12, or 15, characterized in that it comprises the following steps:

1) for all x, performing the Fourier transform of the seismic data y(t,x) for the variable t to transfer to the f-x plane;
2) for each frequency f in the f-x plane:
   2a) take y(n)=Y(f,n);
   2b) selecting a length p for the prediction error filter, a precolorizing factor $\epsilon$, and a precolorizing filter b(0), . . . , b(q), and also a number of iterations for convergence of a(i);
   2c) computing:

$$u(n) = \left[ \frac{y(n)}{c(i)} \right]$$

by up recursive filtering, c(i) being the damped prediction error filter of the preceding iteration (or of the last iteration of the preceding frequency if performing the first iteration for the frequency being iterated);
   2d) computing the covariance matrix or the correlation of u(n);
   2e) solving the system to obtain the coefficients a(i) of the prediction error filter;
   2f) computing the precolorized self-correlation r(i) and the damped prediction error filter c(i);
   2g) returning to 2c) until reaching the desired convergence of the values of a(i);
   2h) obtaining the non-predictable portion e(n) of the data by non-steady recursive filtering;
   2i) subtracting the non-predictable portion e(n) from the data y(n) to obtain the predictable portion $y_0$(n);
   2j) returning to 2a) unless the last frequency has been reached;
3) for all x performing the inverse Fourier transform on $y_0$(n) for the variable t to obtain $y_0$(t,x).

20. A method according to claim 1, applied to restoring data having missing values of index I(j), j lying in the range 1 to m, the method being characterized in that it comprises the following steps:
1) initializing the data to be restored y(n);
2) computing the prediction error filter a(i) for the current y(n);
3) updating y(n) for the current a(i):
   3a) computing m vectors $d_j$=H$p_j$ j=1, . . . , m;
      $p_j$ being the vector containing the impulse response of the jth pulse noise corresponding to the jth missing value of index I(j),
      H being the linear operator such that M=H*H, M being the operator enabling the noise e to be computed form the data y;

3b) computing the vector $s = Hy$;
   3c) computing the matrix $\chi(i,j) = d_i^* d_j$
      $i = 1, \ldots, m$;
   3d) adding a prebleaching factor $\lambda^2$:
      $\chi(i,i) \leftarrow \chi(i,i) + \lambda^2$ $i = 1, \ldots m$;
   3e) computing the vector of components
      $k(i) = d_i^* s$;
   3f) solving the linear system of order $\underline{m}$:

$$\sum_{j=1}^{m} r(i,j)w(j) = k(i) \; i = 1, \ldots, m$$

3g) updating $y(n)$ as follows:

$$y \leftarrow y - \sum_{j=1}^{m} w(j)p_j$$

4) returning to 2) until reaching the desired convergence for a(i), else moving on to 5);

5) computing u:

$$u = s - \sum_{j=1}^{m} w(j)d_j$$

6) computing e=H*u;
7) computing $y_0$ =y−e.

21. A method according to claim 20, characterized in that for $p_j$, the components are taken of coherent noise of unknown amplitude.

22. A method according to claim 21, characterized in that the following is taken:

$$p_j(n)=e^{jn\Delta x k i(f)}$$

with n=0, . . . , N, $k_i$(f) being the dispersion relationship satisfied by the noise.

23. A method according to claim 20, characterized in that step 3) is replaced with following step 3'):
3') updating y(n) for the current a(i):
   3a) initializing $y_{it}$(n)=y(n);
   3b) computing the non-predictable portion e(n) of $y_{it}$(n);
   3c) updating $y_{it}$(n) for only those samples n that correspond to the missing values (n=I(j) for j=1, . . . , m) as follows:

$$y_{it}(n) \leftarrow (1-\lambda^2)y_{it}(n)+\lambda^2 y(n)-e(n)$$

3d) returning to 3b) if the desired convergence for $y_{it}$(n) has been reached, else moving on to 3e);
   3e) updating y(n) for only those samples n that correspond to the missing values, as follows:

$$y(n)=y_{it}(n).$$

24. A method according to claim 20, applied to restoring missing trace portions, characterized in that it comprises the following steps:
1) initializing data y(t,n);
2) using the Fourier transform to go from y(t,n) to Y(f,n);
3) updating a(f,i):
   3a) for all f:
      i) y(n)=Y(f,n);
      ii) statistically computing the prediction error filter a(f,i) for y(n) and i=0 , . . . , p;
      iii) initializing $Y_{it}$(f,n)=Y(f,n) for all n;
      iv) returning to 3a)i), or if last frequency, moving on to 4);
4) updating y(t,n):
   4a) initializing $y_{it}$(t,n)=y(t,n);
   4b) using the Fourier transform to go from $y_{it}$(t,n) to $Y_{it}$(f,n);
   4c) for all f:
      i) $y_{it}$(n)=$Y_{it}$(f,n);
      ii) computing the non-predictable portion e(n) of $y_{it}$(n) by means of the operator M(f) computed from a(f,i) already computed in 3c);
      iii) E(f,n)=e(n);
      iv) returning to i) or moving on to 4d) if last frequency;
   4d) using the inverse Fourier transform to go from E(f,n) to e(t,n);
   4e) updating $y_{it}$(t,n) for only those samples (t,n) that correspond to the missing values as follows:

$$y_{it}(t,n)=(1-\lambda^2)y_{it}(t,n)+\lambda^2 y(t,n)-e(t,n)$$

4f) returning to 4b) or moving on to 4g) if $y_{it}$(t,n) has converged as desired;

4g) updating y(t,n) as follows:

$$y(t,n)=y_{it}(t,n);$$

5) returning to 2) or continuing to 6) if a(f,i) has converged;
6) obtaining reconstituted data y(t,n) that can be separated into $y_0$(t,n) and e(t,n) in the (f-x) domain.

25. A method according to claim 1, applied to interpolating seismic data, characterized in that it includes the following steps, performed in the frequency domain:
1) compute a prediction error filter A(f) for the interpolated data;
2) compute Z(f) by applying the Fourier transform to the known data, which is assumed to be regularly spaced, setting to zero the missing data situated on a grid that is m times finer than the grid of known data, where m is the interpolation factor;
3) construct the prediction error filter:

$$A_z(f)=A(f+1/m)A(f+2/m)\ldots A(f+(m-1)/m)$$

4) compute the interpolated data from which noise has not been removed as follows:

$$Y(f) = \frac{|A_z(f)|^2}{R_z(f)} Z(f)$$

$R_z(f)$ being a precolorized self-correlation of $A_z(f)$.

26. A method according to claim 1, applied to interpolating seismic data, characterized in that it includes the following steps performed in the frequency domain:

1) compute a prediction error filter A(f) for the interpolated data;
2) compute Z(f) by applying the Fourier transform to the known data, which is assumed to be regularly spaced, setting to zero the missing data situated on a grid that is m times finer than the grid of known data, where m is the interpolation factor;
3) compute interpolated data from which noise has been removed as follows:

$$Y_0(f) = Z(f) - \frac{|A(f)|^2}{R(f)} Z(f)$$

27. A method according to claim 20, characterized in that the steps of claims 25 or 26 are implemented in the time domain.

* * * * *

UNITED STATES PATENT AND TRADEMARK OFFICE
CERTIFICATE OF CORRECTION

PATENT NO. : 5,771,203
DATED : June 23, 1998
INVENTOR(S) : Robert Soubaras

It is certified that error appears in the above-identified patent and that said Letters Patent is hereby corrected as shown below:

Claim 1. Col. 28, line 41, delete the fourteenth character "∈" and insert --ε-- therefor; Col. 28, line 43, delete the seventh character "∈" and insert --ε-- therefor.

Claim 5. Col. 29, line 24, delete the thirty-second character "P" and insert "p" therefor; col. 29, line 38, delete the fourth character "-", col. 29, line 38, after the seventeenth character "(" insert -- - -- before "i)"; col. 29, line 38, delete the twenty-first character "∈" and insert --ε-- therefor; and col. 29, line 42, delete first character "Δ" and insert --ε-- therefor.

Claim 7. Col. 29, line 51, delete character eighteen "∈" and insert --ε-- therefor.

Claim 8. Col. 29, line 61, after the eighth character "(" insert -- - -- before "i)".

Claim 13. Col. 30, line 58, delete the thirty-seventh character "∈" and insert --ε-- therefor.

Claim 15. Col. 31, line 31, delete the seventh character "∈" and insert --ε-- therefor.

UNITED STATES PATENT AND TRADEMARK OFFICE
CERTIFICATE OF CORRECTION

PATENT NO. : 5,771,203
DATED : June 23, 1998
INVENTOR(S) : Robert Soubaras

It is certified that error appears in the above-identified patent and that said Letters Patent is hereby corrected as shown below:

Claim 16. Col. 31, line 61, delete character forty-five "=".

Claim 18. Col. 32, line 51, delete the second to last character "∈" and insert --ε-- therefor.

Claim 19. Col. 33, line 6, delete character twenty-two "∈" and insert --ε-- therefor.

Signed and Sealed this

Twenty-ninth Day of September, 1998

Attest:

BRUCE LEHMAN

*Attesting Officer*　　　*Commissioner of Patents and Trademarks*